United States Patent
Theimer et al.

(10) Patent No.: US 11,106,479 B2
(45) Date of Patent: Aug. 31, 2021

(54) VIRTUAL PROVISIONING WITH IMPLEMENTATION RESOURCE BOUNDARY AWARENESS

(75) Inventors: Marvin M. Theimer, Bellevue, WA (US); Peter DeSantis, Seattle, WA (US); Eric Jason Brandwine, Haymarket, VA (US)

(73) Assignee: Amazon Technologies, Inc., Seattle, WA (US)

( * ) Notice: Subject to any disclaimer, the term of this patent is extended or adjusted under 35 U.S.C. 154(b) by 612 days.

(21) Appl. No.: 12/894,496

(22) Filed: Sep. 30, 2010

(65) Prior Publication Data
US 2012/0084443 A1    Apr. 5, 2012

(51) Int. Cl.
*G06F 9/455* (2018.01)
*H04L 12/24* (2006.01)
*G06F 9/50* (2006.01)

(52) U.S. Cl.
CPC ........ *G06F 9/45533* (2013.01); *G06F 9/5027* (2013.01); *H04L 41/0806* (2013.01); *H04L 41/5051* (2013.01); *G06F 2209/5011* (2013.01)

(58) Field of Classification Search
CPC .. G06F 11/203; G06F 9/45533; G06F 9/5027; G06F 2209/5011; H04L 45/586;
(Continued)

(56) References Cited

U.S. PATENT DOCUMENTS 5,453,779 A * 9/1995 Dan .................. H04N 7/17318
725/88
5,996,013 A * 11/1999 Delp ..................... G06F 9/5027
370/232

(Continued)

FOREIGN PATENT DOCUMENTS

CN    100422939 C    10/2008
CN    101458635 A    6/2009
(Continued)

OTHER PUBLICATIONS

A. Whitaker, M. Shaw, and S. D. Gribble. Denali: Lightweight Virtual Machines for Distributed and Networked Applications. Technical Report Feb. 2, 2001, University of Washington, 2002, from: https://dada.cs.washington.edu/research/tr//2002/02/UW-CSE-02-02-01.pdf (Year: 2002).*

(Continued)

*Primary Examiner* — David R Lazaro
(74) *Attorney, Agent, or Firm* — Kilpatrick Townsend & Stockton LLP

(57) ABSTRACT

Virtual resources may be provisioned in a manner that is aware of, and respects, underlying implementation resource boundaries. A customer of the virtual resource provider may specify that particular virtual resources are to be implemented with implementation resources that are dedicated to the customer. Dedicating an implementation resource to a particular customer of a virtual resource provider may establish one or more information barriers between the particular customer and other customers of the virtual resource provider. Implementation resources may require transition procedures, including custom transition procedures, to enter and exit dedicated implementation resource pools. Costs corresponding to active and inactive implementation resources in a dedicated pools associated with a particular customer may be accounted for, and presented to, the customer in a variety of ways including explicit, adjusted per customer and adjusted per type of virtual resource and/or implementation resource.

24 Claims, 17 Drawing Sheets

(58) Field of Classification Search
CPC ..... H04L 49/70; H04L 67/10; H04L 41/0806; H04L 41/5051
USPC .................. 709/201, 202, 220–222, 223–226
See application file for complete search history.

(56) References Cited

U.S. PATENT DOCUMENTS

| | | | |
|---|---|---|---|
| 6,212,389 B1 | 4/2001 | Fapojuwo et al. | |
| 6,968,323 B1* | 11/2005 | Bansal | G06Q 10/06 370/230 |
| 7,398,313 B1* | 7/2008 | Inagaki | G06F 9/466 709/203 |
| 7,433,311 B1 | 10/2008 | Kalyanasundaram et al. | |
| 7,522,036 B1 | 4/2009 | Preuss et al. | |
| 7,610,225 B2 | 10/2009 | O'Neill | |
| 8,473,615 B1* | 6/2013 | Rowland | G06F 9/5077 709/221 |
| 8,484,355 B1* | 7/2013 | Lochhead | H04L 41/0806 709/222 |
| 8,843,624 B2* | 9/2014 | Britsch | G06F 9/4401 709/201 |
| 8,924,982 B2* | 12/2014 | Brandwine | G06F 9/5072 718/104 |
| 10,069,680 B1* | 9/2018 | Wylie | H04L 41/0806 |
| 2002/0156828 A1* | 10/2002 | Ishizaki | H04L 12/4641 709/201 |
| 2004/0221038 A1* | 11/2004 | Clarke, Jr. | G06F 9/5072 709/226 |
| 2005/0131993 A1* | 6/2005 | Fatula, Jr. | G06F 9/5072 709/202 |
| 2006/0025985 A1 | 2/2006 | Vinberg et al. | |
| 2006/0075079 A1* | 4/2006 | Powers | G06F 9/5072 709/220 |
| 2006/0143495 A1* | 6/2006 | Bozak | G06F 9/5061 714/4.1 |
| 2006/0190602 A1 | 8/2006 | Canali et al. | |
| 2006/0212334 A1* | 9/2006 | Jackson | G06F 9/5027 709/226 |
| 2007/0043800 A1 | 2/2007 | Pabarl | |
| 2007/0067435 A1* | 3/2007 | Landis | G06F 9/5016 709/224 |
| 2007/0105574 A1 | 5/2007 | Gupta et al. | |
| 2007/0105575 A1 | 5/2007 | Sampath et al. | |
| 2007/0105576 A1 | 5/2007 | Gupta et al. | |
| 2007/0201361 A1 | 8/2007 | Kumar et al. | |
| 2008/0126547 A1* | 5/2008 | Waldspurger | G06F 9/4881 709/226 |
| 2008/0216082 A1* | 9/2008 | Eilam | G06F 9/5072 718/104 |
| 2008/0222352 A1* | 9/2008 | Booth | H04L 45/7453 711/108 |
| 2008/0320242 A1* | 12/2008 | Jelinek | G06F 9/5077 711/153 |
| 2009/0019535 A1* | 1/2009 | Mishra | G06Q 10/00 726/12 |
| 2009/0157870 A1 | 6/2009 | Nakadai | |
| 2009/0164356 A1 | 6/2009 | Bakman | |
| 2009/0271324 A1 | 10/2009 | Jandhyala et al. | |
| 2009/0271472 A1 | 10/2009 | Scheifler et al. | |
| 2009/0276771 A1* | 11/2009 | Nickolov | G06F 9/4856 717/177 |
| 2009/0300210 A1* | 12/2009 | Ferris | G06F 9/45533 709/235 |
| 2010/0036957 A1* | 2/2010 | Patel | G06F 9/54 709/227 |
| 2010/0144363 A1* | 6/2010 | De Rosa et al. | 455/452.1 |
| 2010/0169490 A1* | 7/2010 | McNair | G06F 9/5083 709/226 |
| 2010/0186010 A1* | 7/2010 | Chalemin | G06F 9/45533 718/1 |
| 2010/0192212 A1 | 7/2010 | Raleigh | |
| 2010/0223364 A1 | 9/2010 | Wei | |
| 2010/0223383 A1* | 9/2010 | Salevan | G06F 11/3442 709/226 |
| 2010/0250744 A1* | 9/2010 | Hadad | G06F 9/4856 709/226 |
| 2010/0299495 A1* | 11/2010 | Frank | G06F 9/5011 711/170 |
| 2010/0306773 A1* | 12/2010 | Lee | G06F 9/5077 718/1 |
| 2011/0055034 A1 | 3/2011 | Ferris et al. | |
| 2011/0119104 A1 | 5/2011 | Levine et al. | |
| 2011/0145412 A1* | 6/2011 | Ford | G06F 9/5077 709/226 |
| 2011/0252420 A1 | 10/2011 | Tung et al. | |
| 2011/0265018 A1* | 10/2011 | Borst | A63F 13/795 715/757 |
| 2011/0295727 A1 | 12/2011 | Ferris et al. | |
| 2011/0310757 A1 | 12/2011 | Yokoyama et al. | |
| 2014/0337531 A1* | 11/2014 | Naseh | H04L 41/5067 709/226 |
| 2019/0261225 A1* | 8/2019 | Eswarakava | H04W 76/10 |

FOREIGN PATENT DOCUMENTS

| | | |
|---|---|---|
| CN | 1771479 A | 5/2016 |
| JP | 2002-024192 | 1/2002 |
| JP | 2002241923 A | 8/2002 |
| JP | 2003124976 | 4/2003 |
| JP | 2004503011 | 1/2004 |
| JP | 2005234637 A | 9/2005 |
| JP | 2007526558 | 9/2005 |
| JP | 2009110347 A | 5/2009 |
| JP | 2009-134640 | 6/2009 |
| JP | 2010205209 A | 9/2010 |
| WO | 2009108344 | 9/2009 |
| WO | 2009147631 A1 | 12/2009 |

OTHER PUBLICATIONS

VMWare, Network Segmentation in Virtualized Environments, May 29, 2009, from: https://www.vmware.com/content/dam/digitalmarketing/vmware/en/pdf/techpaper/network_segmentation.pdf (Year: 2009).*
VMWare, Resource Management Guide, ESX Server 3.5, ESX Server 3i Version 3.5, VritualCenter 2.5, last revised on Jun. 12, 2009, from: https://www.vmware.com/pdf/vi3_35/esx_3/r35/vi3_35_25_resource_mgmt.pdf (Year: 2009).*
Fred Chong, Multi-tenancy and Virtualization, Microsoft, Oct. 23, 2006, from: https://blogs.msdn.microsoft.com/fred_chong/2006/10/23/multi-tenancy-and-virtualization/ (Year: 2006).*
International Search Report and Written Opinion dated Feb. 9, 2012 in PCT Application No. PCT/US11/52592 filed Sep. 21, 2011, 15 pages.
Australian Patent Application No. 2011314183, Patent Examination Report No. 1, dated Apr. 9, 2014.
Japanese Patent Application No. 2013-529433, Official Notice of Rejection, dated Apr. 22, 2014.
Singapore Patent Application No. 201301717-3, Invitation to Respond to Written Opinion with Written Opinion, dated Oct. 29, 2013.
CA2811020, "Office action", dated Mar. 20, 2015, 4 pages.
CN201180047381, "Office Action," dated Aug. 11, 2015, 25 pages.
JP2015-036886 , "Notice of Allowance", dated May 10, 2016, 6 pages.
CA2,811,020 , "Office Action", dated Dec. 2, 2016, 3 pages.
CA2811020, Office Action, dated Oct. 30, 2017, 4 pages.
SG10201508046, Examination Report, dated Nov. 16, 2017, 4 pages.
SG10201508046Q , "Search Report and Written Opinion", dated Apr. 25, 2017, 8 pages.
EP11832978.8 , "Extended European Search Report", dated Dec. 20, 2017, 10 pages.
CN201610296472.5, "Notice of Decision to Grant", dated Apr. 29, 2019, 6 pages.
CN201610296472.5, "Office Action", dated Nov. 23, 2018, 16 pages.
EP11832978.8, "Office Action", dated Apr. 2, 2019, 5 pages.

(56) References Cited

OTHER PUBLICATIONS

EP11832978.8, "Summons to Attend Oral Proceedings", dated Dec. 17, 2020, 9 pages.
Greene, "Virtualization: Transforming the IT Landscape", 2006, 22 pages.
Gulati et al., "VMware Infrastructure: Resource Management with VMware DRS", Revision Nov. 22, 2006 Version: 1.1 Item: VI-ENG-0206-238, Aug. 20, 2006, 24 pages.
IN2189/DELNP/201 , "First Examination Report", dated Nov. 20, 2018, 6 pages.
AU2014265092 , "First Exam Report", dated Feb. 26, 2016, 2 pages.
CA2,811,020 , "Office Action", dated Jan. 28, 2016, 3 pages.
CN201180047381, "Notice of Grant", dated Feb. 23, 2016, 4 pages.
JP2015-036886 , "Office Action", dated Feb. 2, 2016, 4 pages.
PCT/US2011/052592 , "International Preliminary Report on Patentability", dated Apr. 11, 2013, 9 pages.
Japanese Patent Application No. 2013-529433, Official Notice of Rejection, dated Sep. 24, 2014, with English translation.
CN201180047381.3, "Office action", dated Jan. 7, 2015, 13 pages.
JP2013-529433, "Notice of Allowance", dated Jan. 27, 2015, 6 pages.
SG201301717-3, "Examination Report", dated Nov. 17, 2014.

\* cited by examiner

VIRTUAL PROVISIONING WITH IMPLEMENTATION RESOURCE BOUNDARY AWARENESS

BACKGROUND

It has become common for individuals and organizations of various kinds to use computers to perform and/or assist with a wide variety of tasks. Rather than purchasing and maintaining physical computers, it is becoming more and more common to provision virtual computer systems, and other virtual computing resources of various kinds, with a specialized provider of such virtual resources. From a point of view of a customer of a virtual resource provider, the use of virtual computing resources can have a variety of advantages such as cost-efficiency and timely response to changing computing needs. However, conventional virtual resource providers have various shortcomings.

Virtual resource providers may manage large fleets of physical computers including relatively high capacity computers each capable of hosting multiple virtual computer systems. Virtual resource providers can use a variety of methods for assigning virtual computer systems to physical host computers. At some conventional virtual resource providers, a particular virtual computer system provisioned for one customer may share a high capacity computer with virtual computer systems associated with multiple other customers. Such sharing may be unacceptable to one or more of the customers for a variety of reasons including regulatory requirements, organizational policies and/or perceived data security risk. Some conventional virtual resource providers attempt to prevent unacceptable sharing with methods that are detrimental to virtual resource provider effectiveness, to efficiency (including cost-efficiency) and/or to other virtual resource provider advantages, from a customer point of view and/or from a provider point of view.

BRIEF DESCRIPTION OF THE DRAWINGS

Various embodiments in accordance with the present disclosure will be described with reference to the drawings, in which.

Same numbers are used throughout the disclosure and figures to reference like components and features, but such repetition of number is for purposes of simplicity of explanation and understanding, and should not be viewed as a limitation on the various embodiments.

DETAILED DESCRIPTION

Figure 1:
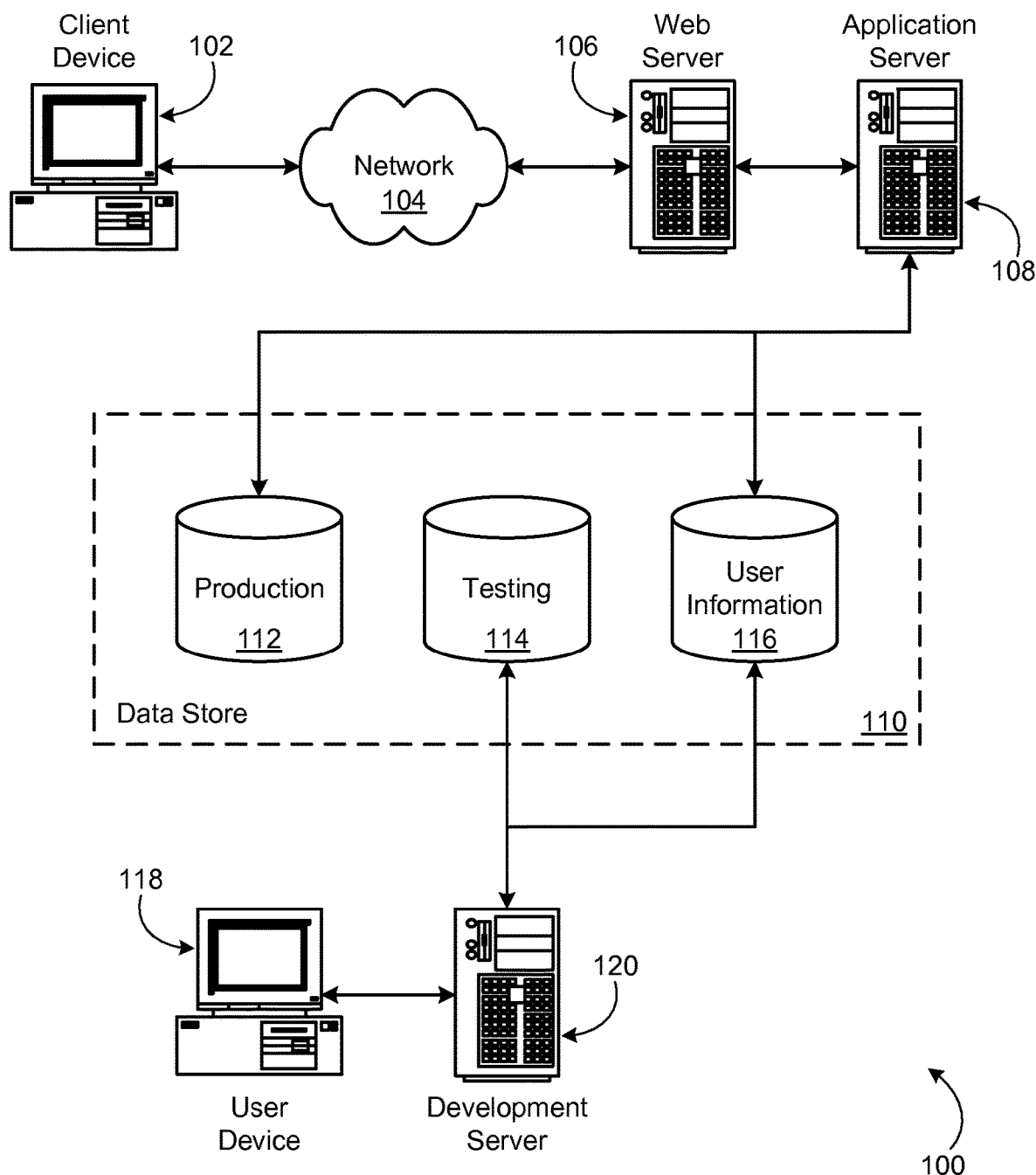
FIG. 1 is a schematic diagram illustrating an example environment for implementing aspects in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

In at least one embodiment, virtual resources may be provisioned in a manner that is aware of, and respects, underlying implementation resource boundaries. A virtual resource provider may provision each of a variety of types of virtual resource (e.g., virtual computer systems, virtual data stores, virtual network connections) with a particular set of implementation resources (e.g., data center space, physical server computers, networking hardware). At least some of the implementation resources may be capable of participating in the implementation of multiple virtual resource instances, each potentially associated with a different customer of the virtual resource provider. In at least one embodiment, a set of customers (i.e., one or more customers) of the virtual resource provider may specify that particular virtual resources are to be implemented with implementation resources that are dedicated to the set of customers (i.e., implemented with "dedicated implementation resources"), and/or that particular implementation resources utilized to implement virtual resources of the set of customers are to be dedicated implementation resources.

Implementation resource boundaries (e.g., physical separation boundaries) may correspond to information barriers (e.g., barriers to unintended information transfer and/or unauthorized data modification). Accordingly, dedicating an implementation resource to a particular set of customers of a virtual resource provider (thereby excluding other customers from the implementation resource) may establish one or more information barriers between the particular set of customers and other customers of the virtual resource provider (i.e., may place the particular set of customers "behind" the one or more information barriers). Alternatively, or in addition, dedication of implementation resources can improve virtual resource performance, for example, at least in part by reducing unanticipated implementation resource contention. As a further alternative, or further in addition, dedication of implementation resources can improve virtual resource fault tolerance, for example, by isolating virtual resources from operation faults that occur at other implementation resources.

The virtual resource provider may maintain a general implementation resource pool containing implementation resources from which no customer of the virtual resource provider is excluded. The virtual resource provider may furthermore maintain one or more dedicated implementation resource pools containing implementation resources dedicated to one or more sets of customers of the virtual resource provider. Each dedicated implementation resource pool may have an associated set of entry and/or exit procedures (collectively "transition procedures") such as implementation resource configuration including access configuration, storage medium formatting, and secure data erase. Implementation resources in a dedicated pool may be active or inactive (i.e., actively participating in implementing one or more virtual resources or idle). The virtual resource provider may monitor activity levels in dedicated implementation resource pools and transition implementation resources from and to the generation implementation resource pool to maintain target inactive to active implementation resource ratios and/or inactive implementation resource "buffers" with sizes based at least in part on forecast changes (e.g., rates of change) in activity levels.

There may be various costs, including financial costs, associated with providing virtual resources to customers, and such costs may be presented to customers of the virtual resource provider. Costs may be presented in terms of virtual resource availability per unit time (e.g., a monthly or hourly cost for each virtual computer system provisioned to a customer), in terms of units of data (e.g., gigabytes) processed, stored and/or transferred, and/or in terms of units of implementation resource actively utilized to implement virtual resources and/or made unavailable to others. Costs corresponding to active and inactive implementation resources in a particular dedicated pool associated with a particular set of customers may be presented to those customers as separate active and inactive amounts in a cost statement. Alternatively, a single amount may be presented to the customers based at least in part on the costs corresponding to maintaining the active and inactive implementation resources in the particular dedicated pool. As another alternative, a single amount may be presented to the customers based at least in part on the costs corresponding to maintaining the active and inactive implementation resources for the virtual resource provider as a whole. In at least one embodiment, customers of the virtual resource provider may mitigate costs associated with implementation resources in dedicated pools by reserving virtual resource instances and/or associated dedicated implementation resources.

Various approaches may be implemented in various environments for various applications. For example, FIG. 1 illustrates aspects of an example environment 100 for implementing aspects in accordance with various embodiments. As will be appreciated, although a Web-based environment may be utilized for purposes of explanation, different environments may be utilized, as appropriate, to implement various embodiments. The environment 100 shown includes both a testing or a development portion (or side) and a production portion. The production portion includes an electronic client device 102, which may include any appropriate device operable to send and receive requests, messages, or information over an appropriate network 104 and convey information back to a user of the device 102. Examples of such client devices include personal computers, cell phones, handheld messaging devices, laptop computers, tablet computers, set-top boxes, personal data assistants, electronic book readers, and the like.

The network 104 may include any appropriate network, including an intranet, the Internet, a cellular network, a local area network, a wide area network, a wireless data network, or any other such network or combination thereof. Components utilized for such a system may depend at least in part upon the type of network and/or environment selected. Protocols and components for communicating via such a network are well known and will not be discussed herein in detail. Communication over the network may be enabled by wired or wireless connections, and combinations thereof. In this example, the network 104 includes the Internet, as the environment includes a Web server 106 for receiving requests and serving content in response thereto, although for other networks an alternative device serving a similar purpose could be utilized as would be apparent to one of ordinary skill in the art.

The illustrative environment 100 includes at least one application server 108 and a data store 110. It should be understood that there may be several application servers, layers, or other elements, processes, or components, which may be chained or otherwise configured, which may interact to perform tasks such as obtaining data from an appropriate data store. As used herein the term "data store" refers to any device or combination of devices capable of storing, accessing, and/or retrieving data, which may include any combination and number of data servers, databases, data storage devices, and data storage media, in any standard, distributed, or clustered environment.

The application server 108 may include any appropriate hardware and software for integrating with the data store as needed to execute aspects of one or more applications for the client device 102, and may even handle a majority of the data access and business logic for an application. The application server 108 provides access control services in cooperation with the data store 110, and is able to generate content such as text, graphics, audio, and/or video to be transferred to the user, which may be served to the user by the Web server 106 in the form of HTML, XML, or another appropriate structured language in this example.

The handling of all requests and responses, as well as the delivery of content between the client device 102 and the application server 108, may be handled by the Web server 106. It should be understood that the Web and application servers 106, 108 are not required and are merely example components, as structured code discussed herein may be executed on any appropriate device or host machine as discussed elsewhere herein. Further, the environment 100 may be architected in such a way that a test automation framework may be provided as a service to which a user or application may subscribe. A test automation framework may be provided as an implementation of any of the various testing patterns discussed herein, although various other implementations may be utilized as well, as discussed or suggested herein.

The environment 100 may also include a development and/or testing side, which includes a user device 118 allowing a user such as a developer, data administrator, or tester to access the system. The user device 118 may be any appropriate device or machine, such as is described above with respect to the client device 102. The environment 100 may also include a development server 120, which functions similar to the application server 108 but typically runs code during development and testing before the code is deployed and executed on the production side and becomes accessible to outside users, for example. In some embodiments, an application server may function as a development server, and separate production and testing storage may not be utilized.

The data store 110 may include several separate data tables, databases, or other data storage mechanisms and media for storing data relating to a particular aspect. For example, the data store 110 illustrated includes mechanisms for storing production data 112 and user information 116, which may be utilized to serve content for the production side. The data store 110 also is shown to include a mechanism for storing testing data 114, which may be utilized with the user information for the testing side. It should be understood that there may be many other aspects that are stored in the data store 110, such as for page image information and access right information, which may be stored in any of the above listed mechanisms as appropriate or in additional mechanisms in the data store 110.

The data store 110 is operable, through logic associated therewith, to receive instructions from the application server 108 or development server 120, and obtain, update, or otherwise process data in response thereto. In one example, a user might submit a search request for a certain type of item. In this case, the data store 110 might access the user information 116 to verify the identity of the user, and may access the catalog detail information to obtain information about items of that type. The information then may be returned to the user, such as in a results listing on a Web page that the user is able to view via a browser on the user device 102. Information for a particular item of interest may be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment 100 in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

Figure 2:
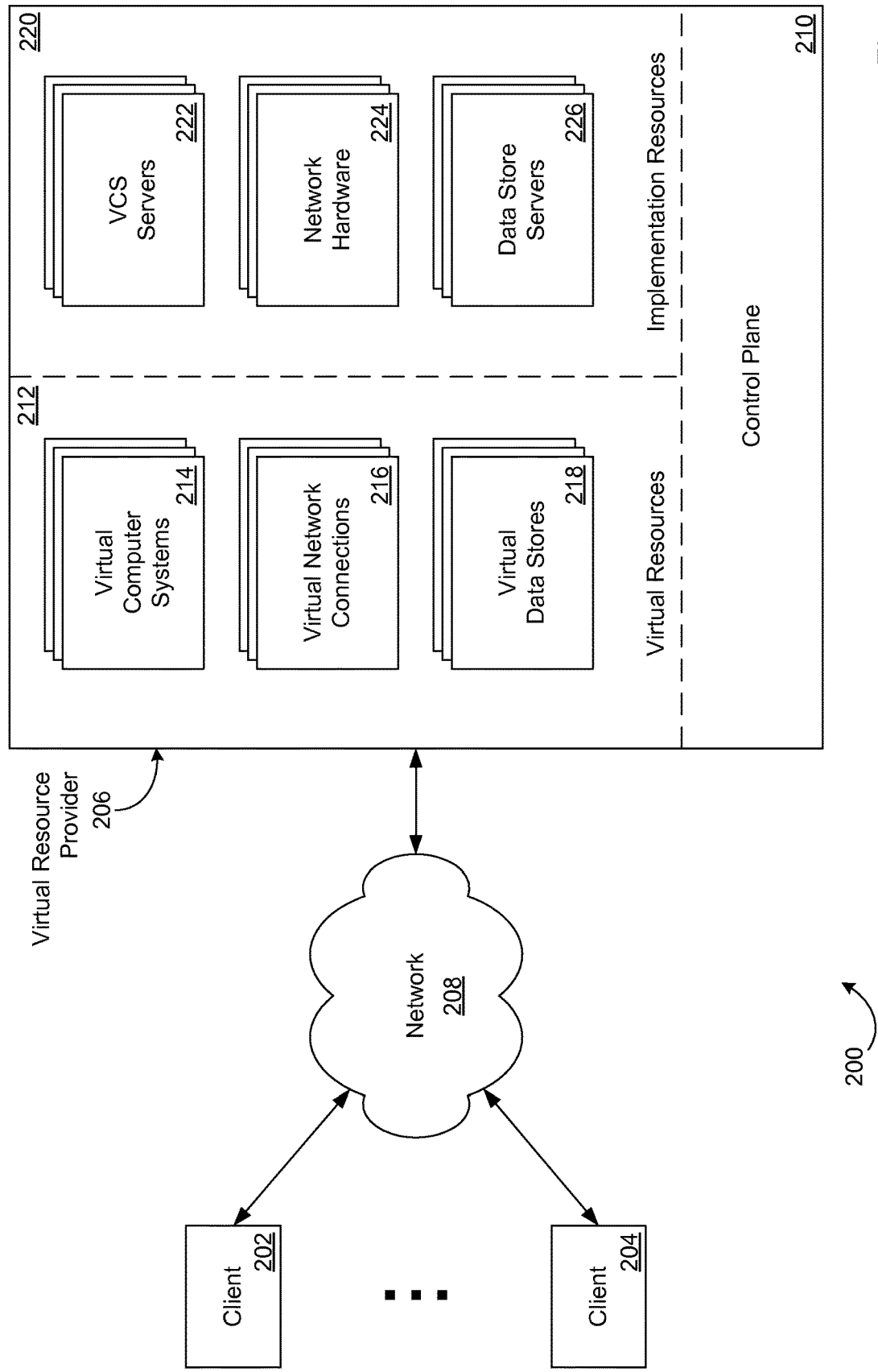
FIG. 2 is a schematic diagram depicting aspects of an example virtual resource provisioning architecture in accordance with at least one embodiment.

In at least one embodiment, one or more aspects of the environment 100 may incorporate and/or be incorporated into a virtual resource provisioning architecture. FIG. 2 depicts aspects of an example virtual resource provisioning architecture 200 in accordance with at least one embodiment. The example virtual resource provisioning architecture 200 includes multiple clients 202-204 communicatively connected to a virtual resource provider 206 over a network 208. For example, the clients 202-204 may corresponding to computing devices such as the computing device 102 of FIG. 1 and/or client programs incorporated into such computing devices. The ellipsis between the client 202 and the client 204 indicates that the virtual resource provisioning architecture 200 may include any suitable number of clients (e.g., thousands, millions, and more) although, for clarity, only two are shown in FIG. 2.

One or more of the clients 202-204 may be utilized by one or more customers of the virtual resource provider 206 to interact with a control plane 210 of the virtual resource provider 206, and thereby provision one or more virtual resources 212. Alternatively, or in addition, one or more of the clients 202-204 may be utilized (not necessarily by virtual resource provider 206 customers) to interact with provisioned virtual resources 212. The provisioned virtual resources 212 may include any suitable virtual resources. Examples of suitable virtual resources 212 include virtual computer systems 214, virtual network connections 216, and virtual data stores 218, as well as virtual resources not shown in FIG. 2 such as specialized data processing agents, media streaming agents including audio and video streaming agents, message queues, publish-subscribe topics configured to notify subscribers having subscriptions that match events published to the publish-subscribe topics, monitoring agents, load balancing agents, and suitable combinations thereof.

The virtual resource provider 206 may include any suitable implementation resources 220. Each of the virtual resources 212 may be implemented by a set of the implementation resources 220. In at least one embodiment, various implementation resources of the implementation resources 220 may be configured to participate in implementing, at least in part, multiple virtual resources of the virtual resources 212. Examples of suitable implementation resources 220 include virtual computer system (VCS) servers 222, network hardware 224, and data store servers 226, as well as implementation resources not shown in FIG. 2 and/or those described in more detail below with reference to FIG. 3, FIG. 4, FIG. 5 and FIG. 6. The control plane 210 may process virtual resource provisioning requests, manage allocation of virtual resources 212 to implementation resources 220 and/or manage allocation of implementation resources 220 to virtual resources 212, as well as provide for associated cost accounting services. An example virtual resource provider control plane in accordance with at least one embodiment is described below in more detail with reference to FIG. 10.

When a particular implementation resource of the implementation resources 220 participates in the implementation of multiple virtual resources of the virtual resources 212, the implementation resource may become contended, for example, the implementation resource may receive sufficient service requests from the multiple virtual resources that request servicing time increases. Contended implementation resources can be a source of unintended and/or unauthorized information transfer between virtual resources, for example, based at least in part on variation in request servicing time. In at least one embodiment, a set of customers may establish a barrier to such information transfer to other customers of the virtual resource provider 206 at least in part by requesting that virtual resources associated with the set of customers be provisioned with dedicated implementation resources. Such barriers may lower a probability that one or more of the other customers of the virtual resource provider gains unauthorized read and/or write access to information (including unpublished information) concerning the virtual resources of the set of customers. Implementation resource dedication boundaries, defining implementation resource dedication units, may correspond to boundaries between physical and/or hardware components including boundaries due to physical barriers and/or physical separations, as well as to hard (e.g., hardware enforced) scheduling and/or timing boundaries, and suitable combinations thereof.

Figure 3:
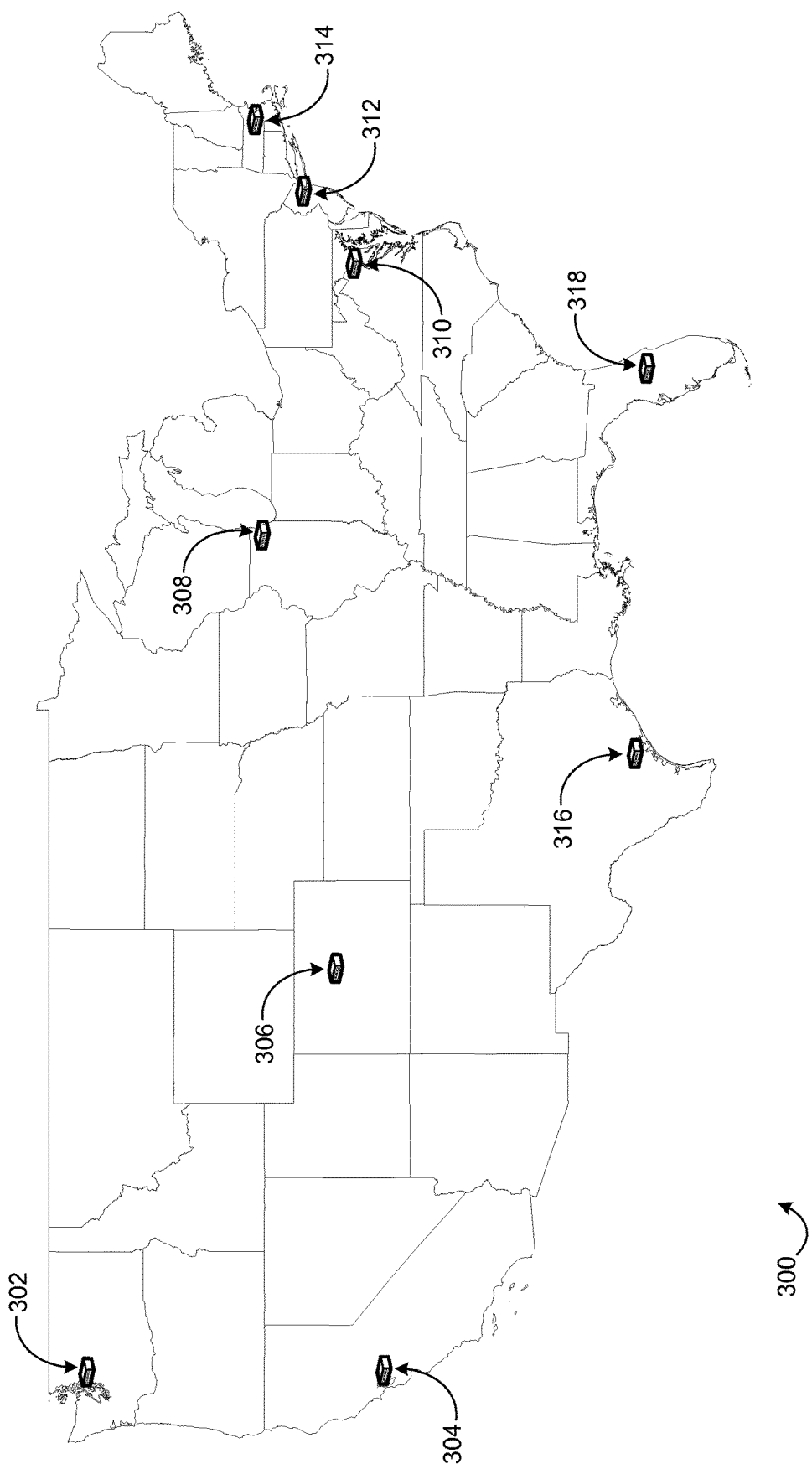
FIG. 3 is a geographic map depicting aspects of an example geographic region in accordance with at least one embodiment.

Implementation resource dedication boundaries may also correspond to geographic boundaries in at least some embodiments. FIG. 3 depicts aspects of an example geographic region 300 in accordance with at least one embodiment. The geographic region 300 includes the contiguous United States and several data centers 302-318. In at least one embodiment, the implementation resources 220 (FIG. 2) of the virtual resource provider 206 include the data centers 302-318 and/or corresponding geographic regions. The physical separation of the data centers 302-318 corresponds to implementation resource dedication boundaries, and may define the corresponding geographical regions. A particular set of customers of the virtual resource provider 206 may specify that virtual resources associated with the set of customers be provisioned with a set of dedicated data centers and/or within a set of dedicated geographical regions. Although not shown in FIG. 3, one or more such data centers and/or corresponding geographic regions may be located internationally.

Figure 4:
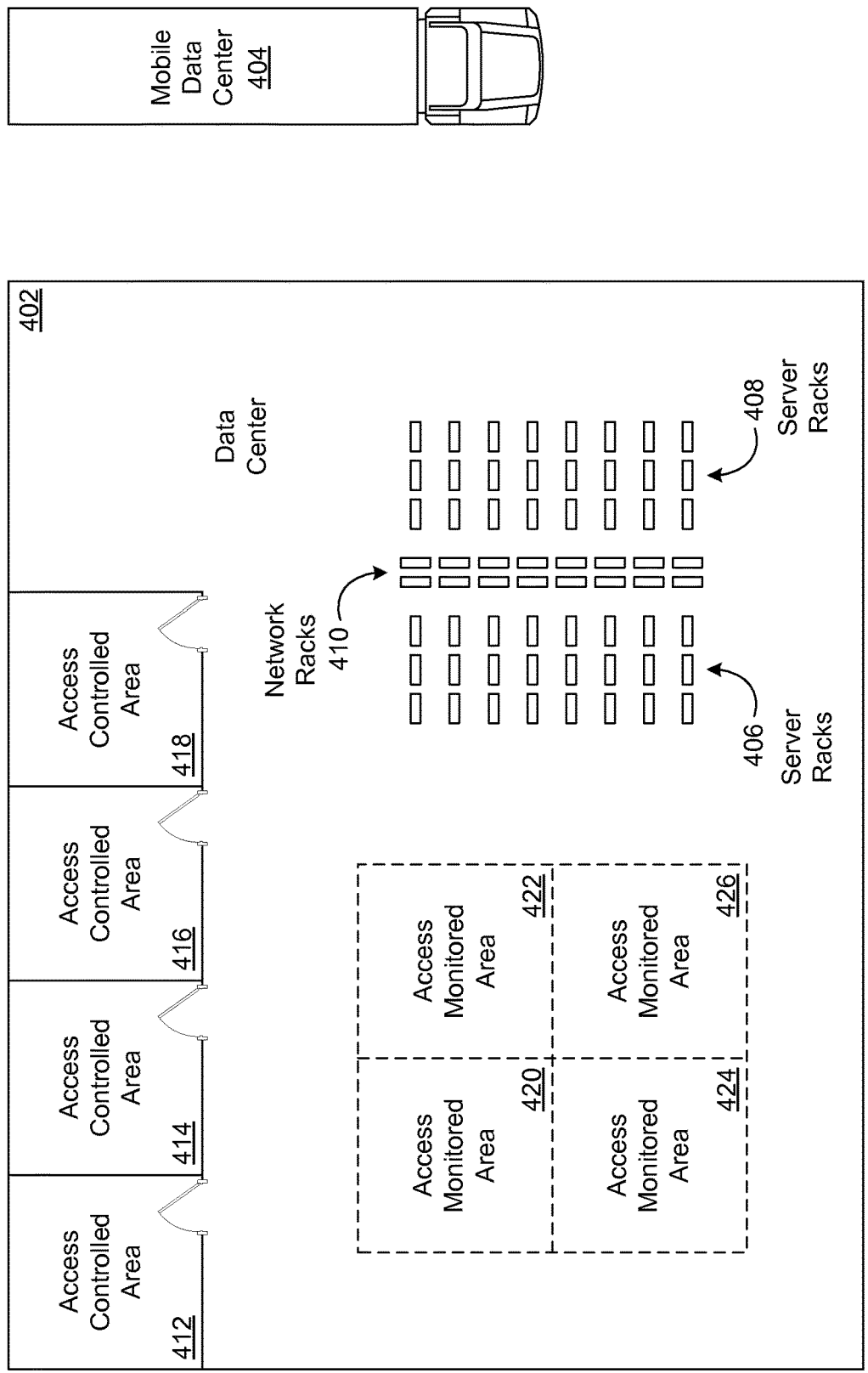
FIG. 4 is a schematic diagram depicting aspects of example data centers in accordance with at least one embodiment.

Implementation resource dedication boundaries and/or units may also correspond to portions of a data center in at least some embodiments. FIG. 4 depicts aspects of example data centers 402, 404 in accordance with at least one embodiment. The example data center 402 includes multiple server racks 406-408 containing server computers such as the VCS servers 222 and the data store servers 226 of FIG. 2, as well as multiple network racks 410 containing network hardware such as the network hardware 224 of FIG. 2. Each such server rack 406-408 and/or network rack 410 may correspond to an implementation resource dedication unit, so that a particular set of customers of the virtual resource provider 206 may specify that virtual resources of the set of customers are to be provisioned with a set of dedicated server racks, a set of network racks, and/or a suitable combination thereof.

The data center 402 may require one or more types of identification and/or access device (e.g., photo ID card, biometric authentication, physical key, purpose-encoded RFID card) that is capable of being reliably authenticated (e.g., cryptographically) in order to gain physical access to the data center 402. Accordingly, the data center 402 may be associated with a security level and/or a security zone (e.g., with respect to a publicly accessible space). In addition, the data center 402 may incorporate one or more higher level and/or different security zones. The data center 402 may include multiple access controlled areas 412-418, for example, corresponding to locked rooms within the data center 402. For example, it may be that only selected and/or specially vetted data center 402 staff have access to the access controlled areas 412-418. Such selection and/or special vetting of data center 402 staff may be part of transition procedures for access controlled areas 412-418 into dedicated implementation resource pools.

The data center 402 may further include multiple access monitored areas 420-426 not necessarily further secured against physical access. For example, access monitored areas 420-426 may log physical entry and/or exit of data center 402 staff, and/or otherwise document staff presence in the access monitored areas 420-426 including with audio and/or video recordings. Each security zone including each access controlled areas 412-418 and each access monitored areas 420-426 may correspond to an implementation resource dedication unit, so that a particular set of customers of the virtual resource provider 206 (FIG. 2) may specify that virtual resources of the set of customers are to be provisioned with a set of dedicated security zones.

The data center 404 of FIG. 4 may be mobile. For example, the data center 404 may be constructed in a shipping container, and made mobile by a variety of means including the illustrated semi-trailer truck. The mobile data center 404 may include server racks, network racks, access controlled areas and/or access monitored areas corresponding to the server racks 406-408, network racks 410, access controlled areas 412-418, and/or access monitored areas 420-426 of the immobile data center 402. The mobile data center 404 may also include suitable mobile power generation hardware, and suitable wireless and/or wireline high speed digital data links including one or more Internet links.

Figure 5:
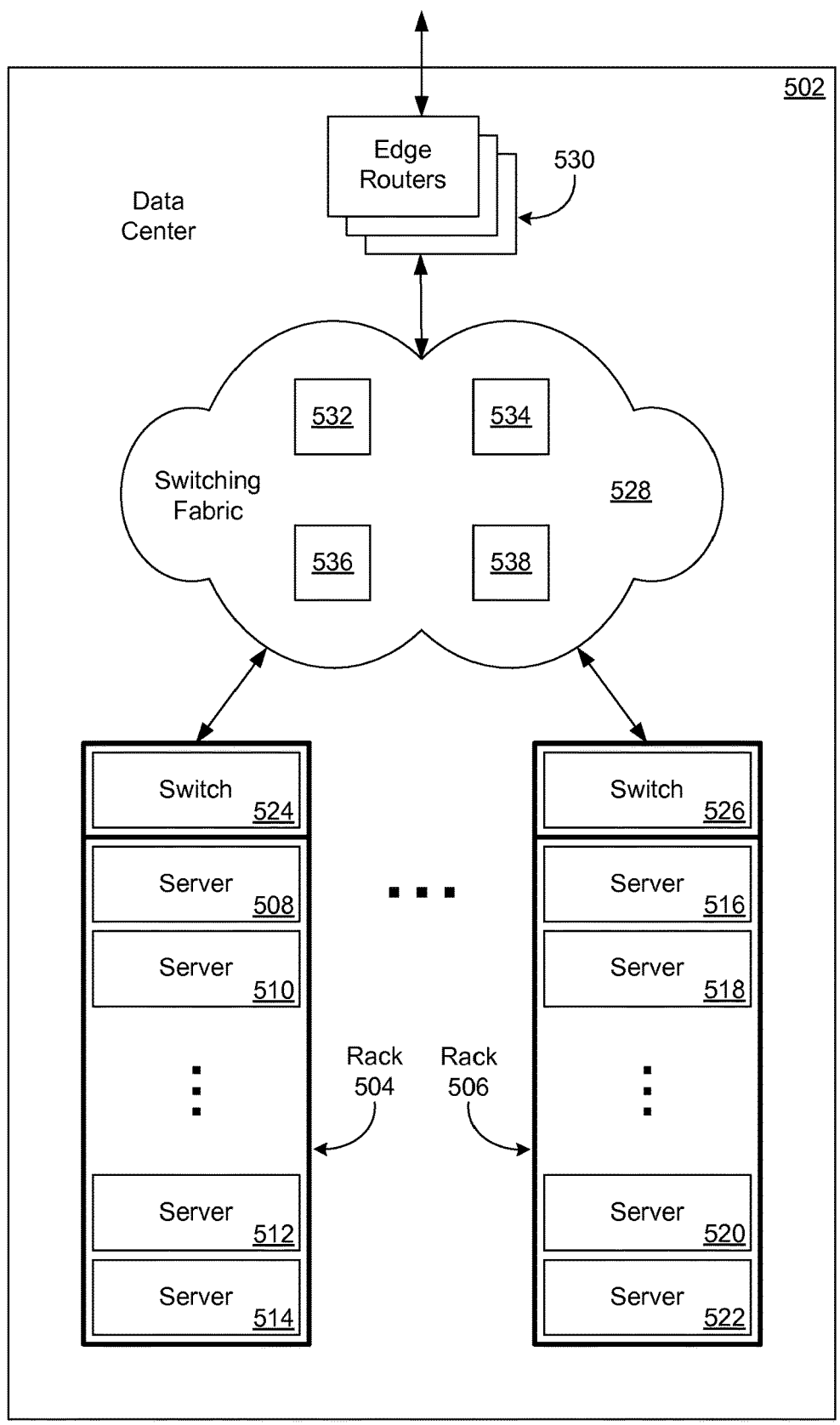
FIG. 5 is a schematic diagram depicting further aspects of the example data centers in accordance with at least one embodiment.

FIG. 5 depicts further aspects of data centers in accordance with at least one embodiment. A data center 502 may include multiple server racks 504-506. The data center 502 is an example of the data centers 402, 404 of FIG. 4. The ellipsis between the server rack 504 and the server rack 506 indicates that the data center 502 may include any suitable number of server racks although, for clarity, only two are shown in FIG. 5. Each server rack 504-506 may participate in maintaining services such as electric power and data communications to multiple server computers 508-514 and 516-522. Again, the ellipses indicate that the server racks 504-506 may include any suitable number of server computers. For example, the server computers 508-522 may include one or more VCS servers 222 (FIG. 2) and/or one or more data store servers 226. Each server 508-522 may correspond to an implementation resource dedication unit.

In FIG. 5, each server rack 504-506 is depicted as including a rack switch 524-526. The rack switches 524 and 526 may be responsible for switching packets of digital data to and from their respective sets of server computers 508-514 and 516-522. Each rack switch 524-526 may correspond to an implementation resource dedication unit. However, in the case (depicted in FIG. 5) that the server rack 504-506 includes one rack switch 524-526, dedicating the rack switch 524-526 to a particular set of customers of the virtual resource provider 206 (FIG. 2) causes dedication of the respective server rack 504-506. This is an example of dedication of a component (an implementation resource dedication sub-unit) of an implementation resource dedication unit causing dedication of the containing dedication unit ("containing unit dedication") in accordance with at least one embodiment. Implementation resources dedication units may indicate which (if any) of their sub-units cause containing unit dedication.

The rack switches 524-526 may be communicatively linked to a data center switching fabric 528 and then to a set of edge routers 530 that connects the data center 502 to one or more other computer networks including the Internet. The switching fabric may include any suitable set of networking components including multiple interconnected switches 532-538 (for clarity, only four are shown in FIG. 5) of one or more switch types arranged in one or more switching layers, as well as routers, gateways, bridges, hubs, repeaters, firewalls, computers, and suitable combinations thereof. In at least one embodiment, the rack switches 524-526 and the edge routers 530 are considered part of the switching fabric

528. The rack switches 524-526, the edge routers 530, and the components of the switching fabric 528 are examples of the network hardware 224 of FIG. 2.

Portions of the switching fabric 528, sets of switching fabric 528 networking components such as sets of the switches 532-538, and/or the edge routers 530 may correspond to implementation resource dedication units. Alternatively, or in addition, a particular set of customers of the virtual resource provider 206 (FIG. 2) may specify that virtual resources of the set of customers be provisioned with a set of dedicated data paths and/or channels (collectively, "data paths") through the switching fabric 528 and/or the edge routers 530. With respect to dedicated data paths, the implementation resource dedication units may correspond to physical data paths such as sets of wires and/or cables. Alternatively, or in addition, the implementation resource dedication units may correspond to hard scheduled communication time slots in a synchronous communication scheme.

Figure 6:
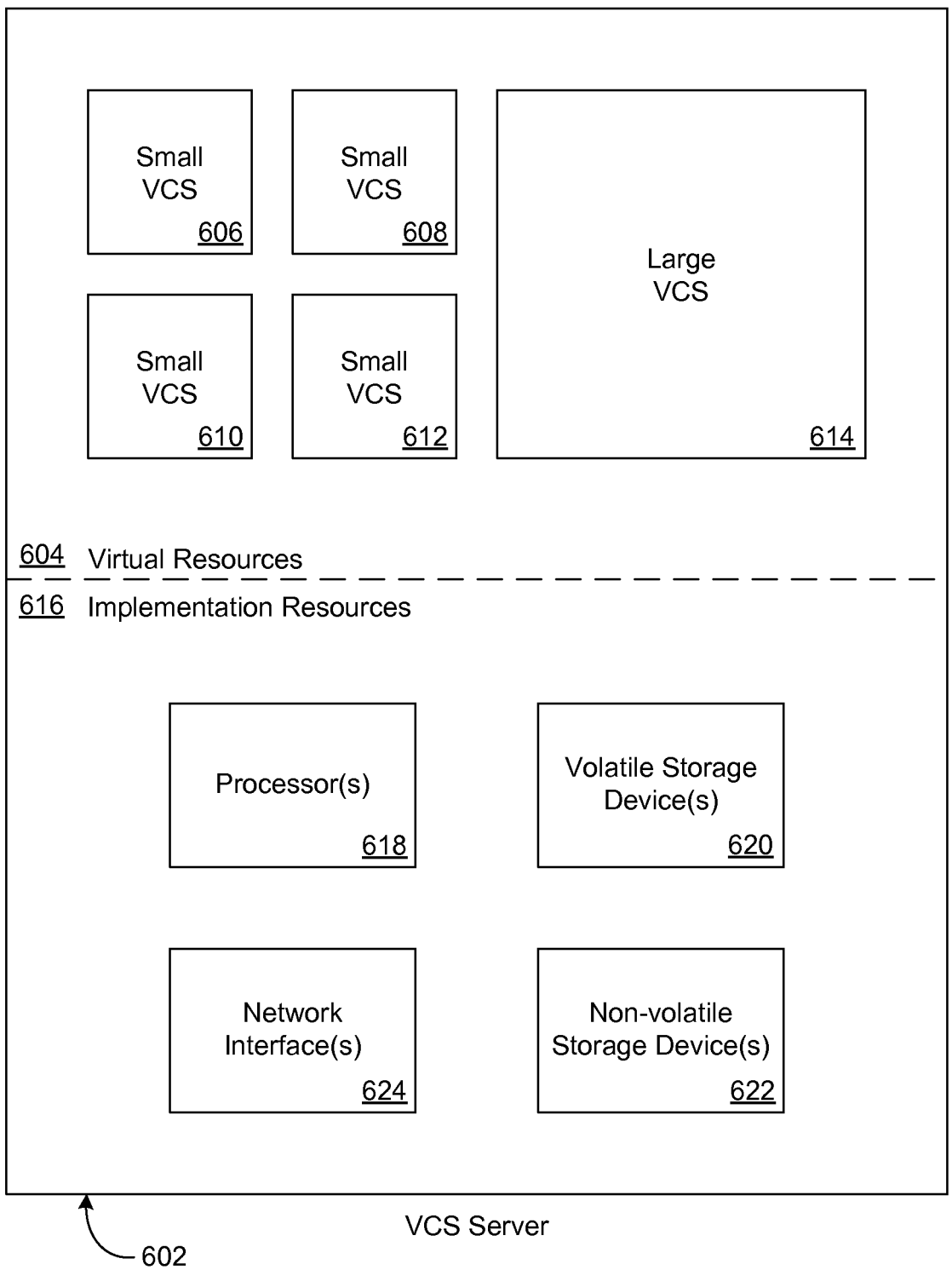
FIG. 6 is a schematic diagram depicting aspects of an example virtual computing system server in accordance with at least one embodiment.

Implementation resource dedication boundaries and/or units may also correspond to portions of a server computer in at least some embodiments. FIG. 6 depicts aspects of an example VCS server 602 in accordance with at least one embodiment. The VCS server 602 of FIG. 6 is an example of the VCS servers 222 of FIG. 2. Virtual resources 604 implemented by the VCS server 602 may include multiple virtual computer systems (VCS) 606-614 of various types. The virtual resources 604 may be implemented with any suitable implementation resources 616 of the VCS server 602. Examples of suitable implementation resources 616 include one or more processors 618 such as central processing units (CPUs) and multi-core CPUs, one or more volatile storage devices 620 such as random-access memory (RAM), one or more non-volatile storage devices 622 such as flash memory and hard disk drives (HDDs), and/or one or more network interfaces 624 such as network interface cards (NICs). Each processor 618, volatile storage device 620, non-volatile storage device 622, and/or network interface 624 may correspond to an implementation resource dedication unit.

Each of the virtual computer systems 606-614 may be implemented with a set of the implementation resources 616. Different types of the virtual computer systems 606-614 may be implemented with different sets of the implementation resources 616. For example, a "large" type virtual computer system may require more implementation resources than a "small" type virtual computer system. A "memory intensive" type of virtual computer system may require an additional portion of the volatile storage device(s) 620 implementation resource. A "processing intensive" type of virtual computer may require an additional portion of the processor(s) 618 implementation resource. The example depicted in FIG. 6 shows the VCS server 602 maintaining four "small" virtual computer systems 606-612 and one "large" virtual computer system 614. This is an example of a virtual resource implementation capacity of the VCS server 602. Of course, other configurations are possible. For example, the VCS server 602 may be able to maintain eight "small" virtual computer systems absent the "large" virtual computer system 614, and so on.

The "small" type virtual computer system may correspond to a minimal virtual resource maintained by the VCS server 602 and/or to a unit virtual computer system cost. The virtual resource provider 206 (FIG. 2) may measure, estimate and/or determine costs for other types of virtual computer system, including virtual computer systems implemented with dedicated implementation resources, in terms of the number of "small" type virtual computer systems displaced by the type. For example, a particular set of customers of the virtual resource provider may specify that virtual computer systems of the set of customers are to be implemented with dedicated hard disk drives. If the VCS server 602 is typically configured to share each hard disk drive with two "small" virtual computer systems, then the virtual computer systems with dedicated hard disk drives displace at least two such "small" virtual computer systems.

Figure 7:
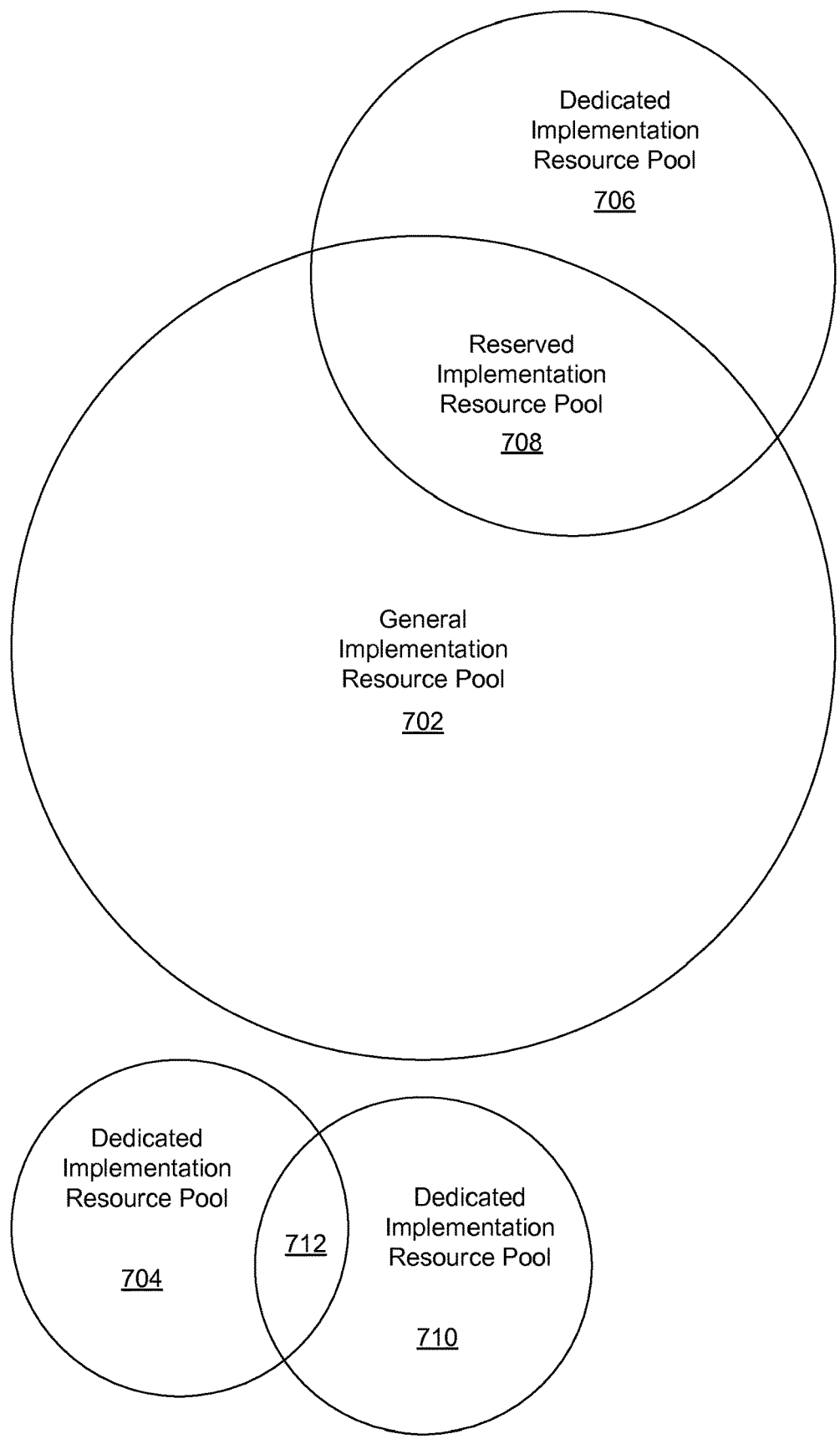
FIG. 7 is a schematic diagram depicting aspects of example implementation resource pools in accordance with at least one embodiment.

In at least one embodiment, dedicated implementation resources are drawn (i.e., allocated) from dedicated implementation resource pools. For example, a dedicated implementation resource pool may be established corresponding to each set of customers of the virtual resource provider 206 (FIG. 2) that requests the provisioning of virtual resources 212 with dedicated implementation resources, and the dedicated implementation resources that implement the requested virtual resources may then be drawn from the dedicated implementation resource pool associated with the set of customers. FIG. 7 depicts aspects of example implementation resource pools in accordance with at least one embodiment. FIG. 7 depicts a general implementation resource pool 702 and three dedicated implementation resource pools 704, 706, 710.

In this example, implementation resources 220 (FIG. 2) begin in the general implementation resource pool 702. The three dedicated implementation resource pools 704, 706, 710 may be established for three different sets of customers of the virtual resource provider 206. The dedicated implementation resource pool 704 and the dedicated implementation resource pool 710 have an overlapping portion 712. Implementation resources in the overlapping portion 712 may be utilized to implement virtual resources of the set of customers associated with either the dedicated implementation resource pool 704 or the dedicated implementation resource pool 710. Alternatively, or in addition, the overlapping portion 712 may be configured as a distinct dedicated implementation resource pool 712 associated with virtual resources, including joint virtual resources, of the joint set of customers associated with both the dedicated implementation resource pool 704 and the dedicated implementation resource pool 710.

Implementation resources 220 may be transitioned from the general implementation resource pool 702 to the dedicated implementation resource pools 704, 706, 710, 712 in accordance with implementation resource transition procedures specified by at least one of the respective set of customers, thereby dedicating the transitioned implementation resources to the set of customers. Implementation resources 220 may be transitioned to the dedicated implementation resource pools 704, 706, 710, 712 responsive to virtual resource provisioning requests. Such requests may fail and/or be delayed with respect to fulfillment when the general implementation resource pool 702 contains insufficient implementation resources of the type(s) required to fulfill the requests. To avoid such problems, virtual resource provider 206 customers may establish reserved implementation resource pools.

In the example depicted in FIG. 7, the set of customers associated with the dedicated implementation resource pool 706 has established a reserved implementation resource pool 708 (e.g., with the control plane 210 of FIG. 2). In at least one embodiment, implementation resources 220 in the reserved implementation resource pool 708 remain in the general implementation resource pool 702 until required to fulfill a virtual resource provisioning request. However, when required, implementation resources 220 in the reserved implementation resource pool 708 are transitioned to the dedicated implementation resource pool 706 even when, at the time, those implementation resources are participating in the implementation of virtual resources of one or more other customers. That is, the set of customers associated with the reserved implementation resource pool 708 is given priority to the implementation resources 220 in the reserved implementation resource pool 708. The virtual resources of preempted customers may be migrated to implementation resources in the general implementation resource pool 702 or, when the general implementation resource pool 702 does not contain sufficient implementation resources of the appropriate type(s), the virtual resources may be de-provisioned.

Figure 8:
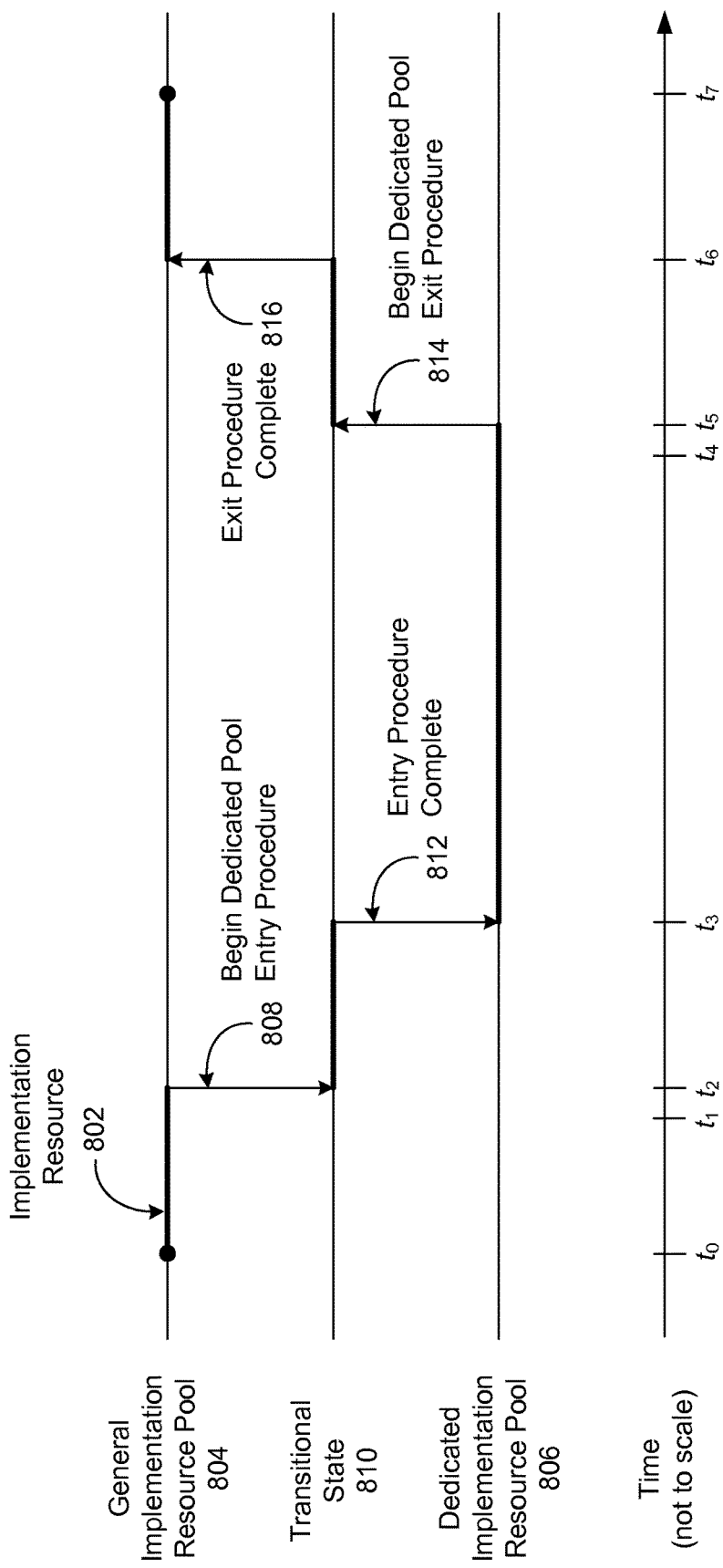
FIG. 8 is a timing diagram depicting aspects of example dedicated implementation resource pool transition procedure timing in accordance with at least one embodiment.

Although some dedicated implementation resource pool transition procedures can be fast (e.g., on the order of milliseconds), some transition procedures, particularly custom transition procedures specified by at least one customer of the virtual resource provider 206, require a significant amount of time to complete (e.g., seconds, minutes, hours, and more). FIG. 8 depicts aspects of example dedicated implementation resource pool transition procedure timing in accordance with at least one embodiment.

At a time $t_0$, an implementation resource 802 begins in a general implementation resource pool 804. For example, the implementation resource 802 may be one of the implementation resources 220 of FIG. 2, and the general implementation resource pool 804 may correspond to the general implementation resource pool 702 of FIG. 7. At a time $t_1$, a virtual resource provider 206 event occurs that requires a transition of the implementation resource 802 to a dedicated implementation resource pool 806. For example, the event may be a virtual resource 212 provisioning request, or an automated transition to meet forecast provisioning requests, and the dedicated implementation resource pool 806 may correspond to the dedicated implementation resource pool 704 of FIG. 7.

At a time $t_2$, a dedicated implementation resource pool entry procedure 808 may begin. The entry procedure 808 may be any suitable implementation resource 802 (re)configuration procedure. Examples of suitable entry procedures include data storage media formatting, data storage media erasure including secure data erasure procedures, software installation, component configuration, component reallocation, access control configuration, firewall reconfiguration, virtual resource migration (e.g., to alternate implementation resources), authentication credential creation and issuance, mobile data center 404 (FIG. 4) relocation, manual review of implementation resource transition by customer, customer-provided entry procedures including customer-provided computer-executable instructions and/or any suitable combination thereof. In at least one embodiment, customers select the dedicated implementation resource pool entry procedure 808 from a set of such procedures offered by the virtual resource provider 206 (FIG. 2). The set of offered procedures may be pre-defined and/or dynamically generated by the virtual resource provider 206 for a particular set of customers.

Until time $t_3$, when the entry procedure 808 is complete, the implementation resource 802 may be in a transition state 810. While in the transition state 810, the implementation resource 802 does not participate in implementing virtual resources 212 (FIG. 2). At time $t_3$, the entry procedure 808 completes 812, and the implementation resource 802 enters the dedicated implementation resource pool 806. While in the dedicated implementation resource pool 806, the implementation resource 802 may participate in implementing virtual resources 212 of the associated set of customers.

At a time $t_4$, another virtual resource provider 206 (FIG. 2) event may occur that requires a transition of the implementation resource 802 from the dedicated implementation resource pool 806 back to the general implementation resource pool 804. For example, the event may be a virtual resource 212 de-provisioning request, or an automated transition to optimize a proportion of idle implementation resources 220 in the dedicated implementation resource pool 806. At a time $t_5$, a dedicated implementation resource pool exit procedure 814 may begin. The exit procedure 814 may be any suitable implementation resource 802 (re)configuration procedure including those described above for the entry procedure 808 and their logical and/or procedural complements. Again, in at least one embodiment, customers select the dedicated implementation resource pool exit procedure 814 from a pre-defined set of such procedures.

Until time $t_6$, when the exit procedure 814 is complete, the implementation resource 802 may again be in the transition state 810. At time $t_6$, the exit procedure 814 completes 816, the implementation resource 802 exits the dedicated implementation resource pool 806 and reenters the general implementation resource pool 804. After time $t_6$, the implementation resource 802 may repeatedly enter and exit the dedicated implementation resource pool 806, and/or other dedicated implementation resource pools not shown in FIG. 8, until the implementation resource 802 reaches the end of its service life at time $t_7$.

Figure 9:
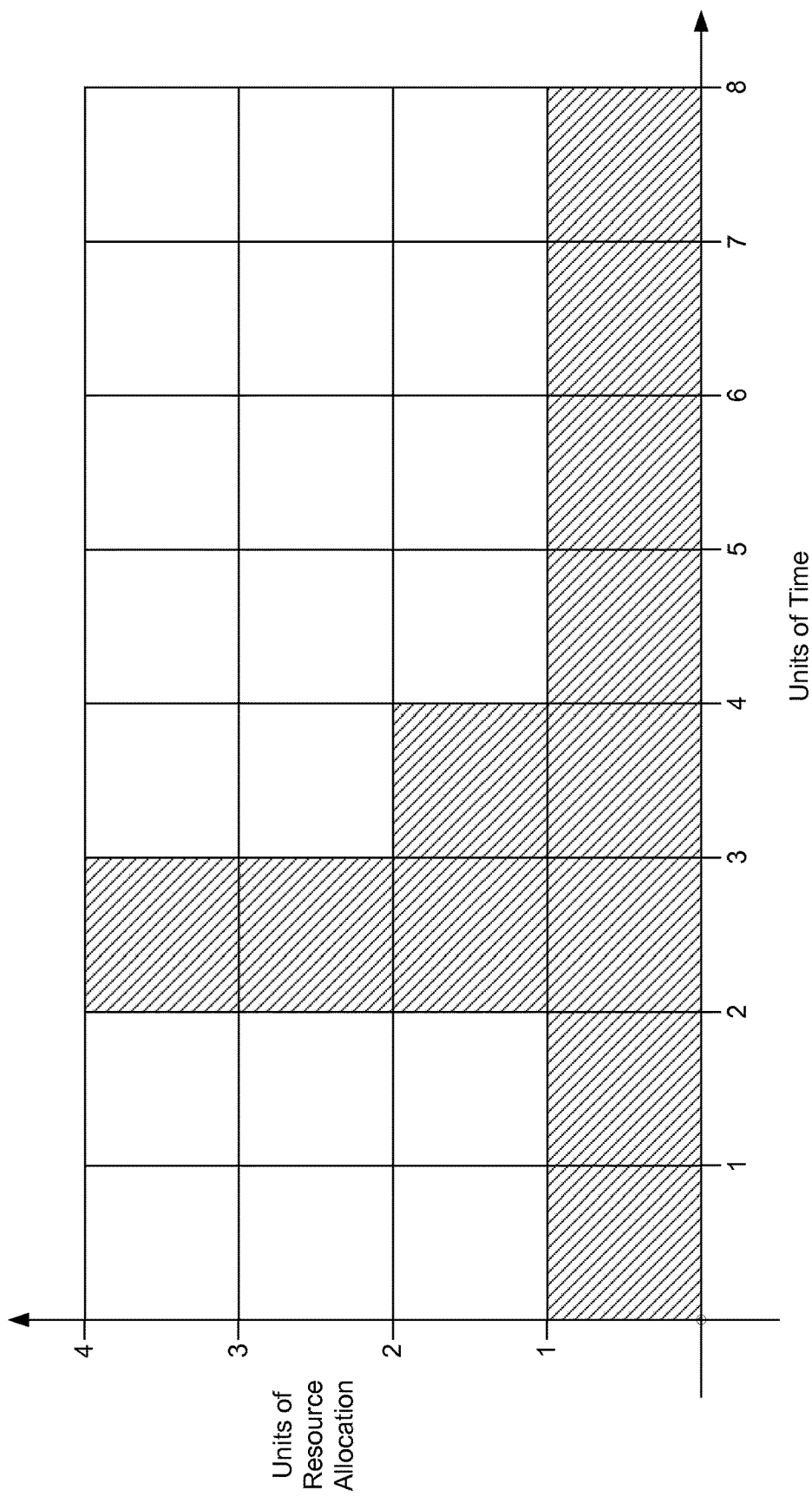
FIG. 9 is a graph depicting aspects of an example implementation resource utilization accounting scheme in accordance with at least one embodiment.

As described above with respect to FIG. 6, some implementation resources may implement multiple virtual resources (i.e., may be "apportionable" implementation resources). For example, the VCS server 602 may implement multiple virtual computing systems. In such cases it can happen that one portion of an apportionable implementation resource is allocated to implementing one or more virtual resources (is "allocated"), while another portion remains unallocated. When the apportionable implementation resource is dedicated to a particular set of customers of the virtual resource provider 206 (FIG. 2), the unallocated portion is furthermore unavailable for allocation to other customers of the virtual resource provider, and this may correspond to a decreased probability that the dedicated apportionable implementation resource will achieve 100% utilization. From the point of view of the virtual resource provider 206, this is an opportunity cost. Such costs can be accounted for in a variety of ways. FIG. 9 depicts aspects of an example implementation resource utilization accounting scheme in accordance with at least one embodiment.

FIG. 9 depicts utilization of an example apportionable implementation resource incorporating four units of resource allocation (or "resource allocation units") each capable of independent participating in the implementation of one or more virtual resources 212 (FIG. 2). For example, the example apportionable implementation resource may be one of the VCS servers 222 capable of implementing four "small" type virtual computer systems, or one "large" type virtual computer system. The virtual resource implementation capacity of an apportionable implementation resource may be measured in resource allocation units. For example, the implementation capacity of the VCS servers 222 may be measured in terms of a standardized virtual computer system unit such as the "small" type virtual computer system.

FIG. 9 further depicts utilization of the example apportionable implementation resource over eight units of time (or "time units", e.g., seconds, hours, months, and so on). During the first two time units, one of the four resource allocation units is allocated (as indicated by the square shaded with diagonal lines), and may be active (i.e., actively participating in the implementation of at least one virtual resource), while three of the four resource allocation units are unallocated (as indicated by the unshaded squares), and are inactive. In at least one embodiment, allocated resource allocation units that are idle are also considered inactive. During the third time unit, each of the four resource allocation units are allocated. During the fourth time unit, two of the four resource allocation units are allocated. For the remaining four time units, one of the four resource allocation units are allocated.

Each square in FIG. 9, shaded or unshaded, corresponds to a resource utilization amount, namely a multiplicative product of a resource allocation unit and a time unit (herein called a "resource hour" for clarity). For example, VCS server utilization may be measured in "small" VCS hours. If the example apportionable implementation resource were in the general implementation resource pool 702 (FIG. 7), 4×8=32 resource hours would be available for allocation. In the example utilization depicted in FIG. 9, 12 resource hours are actually allocated over the 8 "hour" time period, resulting an opportunity cost of 20 resource hours to the virtual resource provider 206 (FIG. 2) if the example apportionable implementation resource is dedicated to a particular customer.

Figure 10:
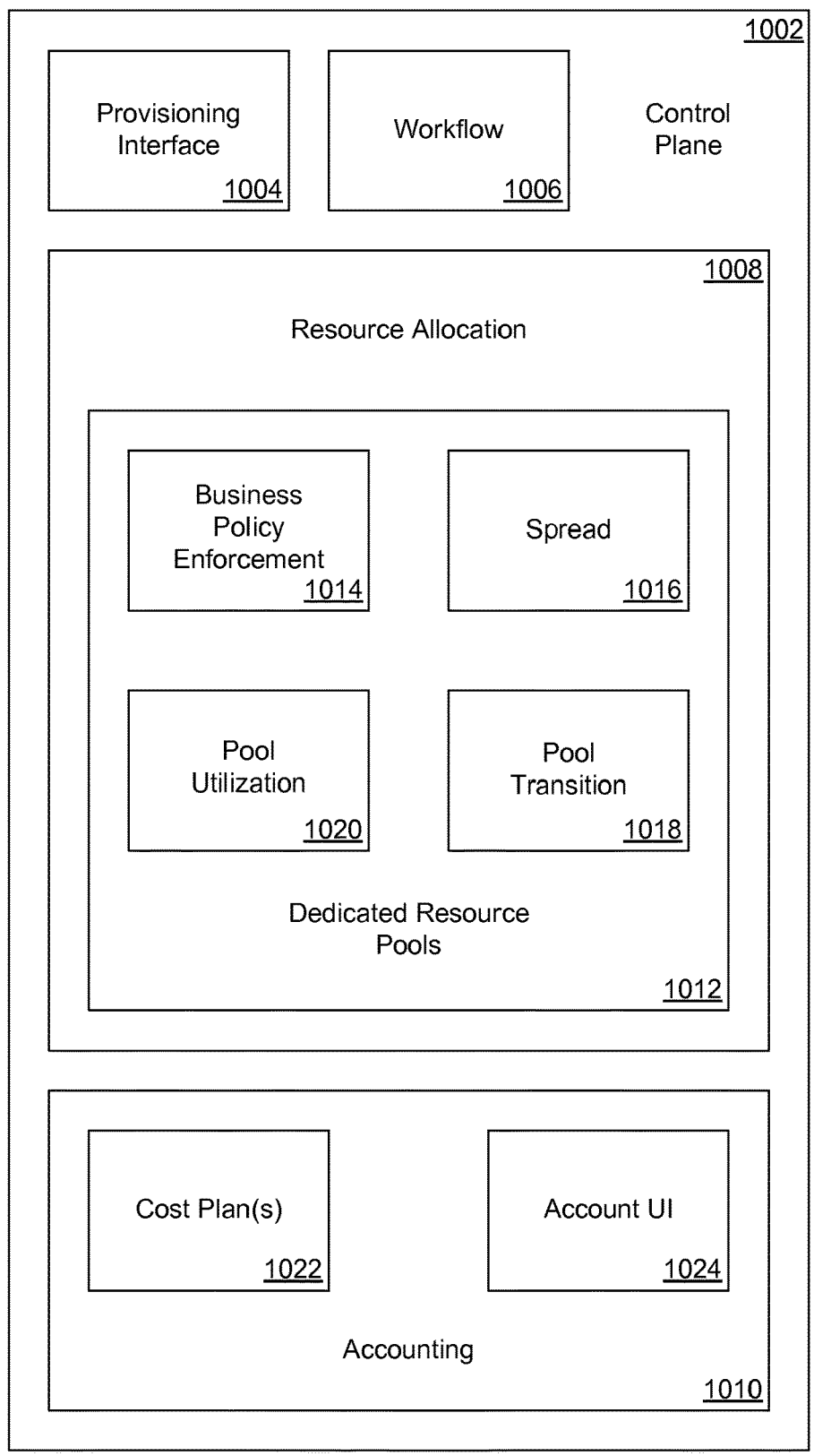
FIG. 10 is a schematic diagram depicting aspects of an example virtual resource provider control plane in accordance with at least one embodiment.

Provisioning, configuration, re-configuration, and/or de-provisioning (collectively, "provisioning") of virtual resources may be controlled by the control plane 210 (FIG. 2) of the virtual resource provider 206. FIG. 10 depicts aspects of an example control plane 1002 in accordance with at least one embodiment. The control plane 1002 of FIG. 10 is an example of the control plane 210 of FIG. 2. The control plane 1002 may include a provisioning interface 1004 configured at least to receive virtual resource 212 provisioning requests from one or more of the clients 202-204, a workflow component 1006 configured at least to guide responses to provisioning requests in accordance with one or more provisioning workflows, a resource allocation component 1008 configured at least to manage allocation of implementation resources 220 to virtual resources 212, and an accounting component 1010 configured at least to track and present costs associated with the virtual resources 212 and/or the implementation resources 220.

The provisioning interface 1004 may include any suitable provisioning interface elements. Examples of suitable provisioning interface elements include interface elements that correspond to requests to provision, configure, reconfigured and/or de-provision the virtual resources 212 (FIG. 2), as well as interface elements that provide access to virtual resource 212 configuration information, and one or more interface elements enabling authentication to establish authority for such provisioning-related operations. The provisioning interface 1004 may incorporate and/or be incorporated in a user interface (UI) such as a graphical user interface (GUI), a Web-based interface, a programmatic interface such as an application programming interface (API) and/or a set of remote procedure calls (RPCs) corresponding to provisioning interface elements, a messaging interface such as a messaging interface in which the interface elements of the provisioning interface 1004 correspond to messages of a communication protocol, and/or any suitable combination thereof.

In at least one embodiment, the provisioning interface 1004, the resource allocation component 1008, and the accounting component 1010 may create, and/or cause the workflow component 1006 to create, one or more workflows that are then maintained by the workflow component 1006. Workflows, such as provisioning workflows and policy enforcement workflows, may include one or more sequences of tasks to be executed to perform a job, such as provisioning or policy enforcement. A workflow, as the term is used herein, is not the tasks themselves, but a task control structure that may control flow of information to and from tasks, as well as the order of execution of the tasks it controls. For example, a workflow may be considered a state machine that can manage and return the state of a process at any time during execution. Workflows may be created from workflow templates. For example, a provisioning workflow may be created from a provisioning workflow template configured with parameters by the resource allocation component 1008. As another example, a policy enforcement workflow may be created from a policy enforcement workflow template configured with parameters by the resource allocation component 1008.

The workflow component 1006 may modify, further specify and/or further configure established workflows. For example, the workflow component 1006 may select particular implementation resources 220 (FIG. 2) of the virtual resource provider 206 to execute and/or be assigned to particular tasks. Such selection may be based at least in part on the computing resource needs of the particular task as assessed by the workflow component 1006. As another example, the workflow component 1006 may add additional and/or duplicate tasks to an established workflow and/or reconfigure information flow between tasks in the established workflow. Such modification of established workflows may be based at least in part on an execution efficiency analysis by the workflow component 1006. For example, some tasks may be efficiently performed in parallel, while other tasks depend on the successful completion of previous tasks.

As part of provisioning a virtual resource, the provisioning interface 1004 and/or the workflow component 1006 may request that the resource allocation component 1008 determine the appropriate set of the implementation resources 220 (FIG. 2) required to implement the virtual resource, determine whether the required implementation resources are available and/or in accordance with virtual resource provider 206 allocation policies, and/or allocate the required implementation resources. The resource allocation component 1008 may incorporate any suitable resource allocation and/or resource scheduling algorithm. Such algorithms are well known to those of skill in art, and need not be described here in detail. The resource allocation component 1008 may include a dedicated resource pools component 1012 configured at least to manage the establishment and maintenance of dedicated implementation resource pools such as the dedicated implementation resource pools 704, 706 of FIG. 7.

The dedicated resource pools component 1012 may include a business policy enforcement component 1014 configured at least to analyze an allocation request with respect to a set of resource allocation business policies and provide an evaluation (e.g., permit or deny) with respect to whether the allocation request is in accordance with the set of resource allocation business policies. Alternatively, or in addition, the business policy enforcement component 1014 may participate in allocation of implementation resources 220 (FIG. 2) to virtual resources 212, and/or virtual resources 212 to implementation resources 220, to enforce the set of resource allocation business policies. The set of resource allocation business policies may include any suitable resource allocation policies. Examples of suitable resource allocation policies include policies having conditions based on parameters such as type and/or number of dedicated virtual resources requested, corresponding type and/or number of dedicated implementation resources, cost plan of requesting customer, current levels and/or proportions of unallocated implementation resources, forecast levels and/or proportions of inactive dedicated implementation resources (e.g., in the requesting customer's dedicated implementation resource pool), and suitable combinations thereof. Resource allocation policies may include any suitable conditions such as compound conditions specified with Boolean operators and conditions specifying that particular numbers, levels and/or proportions are above a minimum value, below a maximum value and/or within a specified range of values.

With respect to implementation resources that implement multiple virtual resources, virtual resource density or virtual resource spread corresponds to a number of virtual resources per unit implementation resource (e.g., the number of virtual computing systems per VCS server 602). Customers of the virtual resource provider 206 (FIG. 2) may request that provisioned virtual resources have a specified density or spread, for example, to reduce a probability that multiple of the customer's virtual resources will be affected by an implementation resource failure. High spreads (low densities) for virtual resources implemented with dedicated implementation resources can result in poor implementation resource utilization efficiencies (e.g., relatively high inactive implementation resource utilization to active implementation resource utilization ratios such as utilization ratios over 20%). In at least one embodiment, the set of resource allocation business policies may include one or more policies having conditions based on virtual resource density and/or spread levels (e.g., setting one or more density and/or spread limits). The dedicated resource pools component 1012 may further include a spread component 1016 configured at least to allocate dedicated implementation resources in accordance with permitted density and/or spread levels. Alternatively, or in addition, the spread component 1016 may be configured at least to allocate and/or reallocate dedicated implementation resources to achieve a maximum permitted and/or specified virtual resource density, and/or to maximize a number of free (i.e., 0% allocated) implementation resource dedication units.

The dedicated resource pools component 1012 may further include a pool transition component 1018 configured at least to transition and/or manage the transition of implementation resources 220 to and from dedicated implementation resource pools 704, 706 (FIG. 7). The implementation resources 220 (FIG. 2) may be associated with a set of dedicated pool transition procedures. For example, each type of implementation resource may have an associated transition procedure. Alternatively, or in addition, customers of the virtual resource provider 206 may specify dedicated pool transition procedures for particular types of virtual resource and/or implementation resource. The pool transition component 1018 may identify a set of appropriate transition procedures associated with a particular set of virtual resources to be provisioned with implementation resources that include one or more dedicated implementation resources. The pool transition component 1018 may execute such transition procedures. Alternatively, or in addition, the pool transition component 1018 may create (or cause the workflow component 1006 to create) one or more dedicated pool transition workflows corresponding to the identified set of dedicated pool transition procedures.

The dedicated resource pools component 1012 may further include a pool utilization component 1020 configured at least to monitor activity and/or inactivity levels in dedicated implementation resource pools 704-706 (FIG. 7), forecast activity and/or inactivity levels in dedicated implementation resource pools 704-706, and initiate implementation resource transitions to and from dedicated implementation resource pools 704-706. Implementation resources in dedicated implementation resource pools 704-706 may be inactive for a variety of reasons. For example, implementation resources may have been transitioned to the dedicated pools 704-706 in anticipation of virtual resource provisioning requests that have not yet occurred, or to participate in the implementation of virtual resources that have been de-provisioned. Such inactive implementation resources may be an unnecessary expense for the responsible customer and/or an opportunity cost for the virtual resource provider 206 (FIG. 2).

However, since the time to transition implementation resources from the general implementation resource pool 702 (FIG. 7) may be significant, some level of inactivity in dedicated implementation resource pools 704-706 (i.e., an inactive dedicated implementation resource "buffer") may be desirable. The responsible customer and/or a virtual resource provider 206 (FIG. 2) administrator may specify one or more target levels of activity and/or inactivity for each dedicated implementation resource pool 704-706. In at least one embodiment, an activity and/or inactivity target may be set for each type of implementation resource. Activity and/or inactivity targets may be specified in terms of resource allocation unit numbers, implementation resource dedication unit numbers, proportions thereof, and/or derivatives thereof including rates of change, change velocities, change accelerations, first derivatives, second derivatives, third derivatives, and any suitable level derivative. The pool utilization component 1020 may forecast values corresponding to activity and/or inactivity targets based at least in part on monitored activity and/or inactivity levels, and schedule implementation resource transitions to and from the dedicated implementation resource pools 704-706 to meet corresponding activity and/or inactivity targets based at least in part on the forecast values.

The accounting component 1010 may maintain an account for each customer of the virtual resource provider 206 (FIG. 2). Utilization and/or costs associated with virtual resources 212 provisioned by a customer, and/or associated implementation resources 220, may be recorded in the customer's account. The accounting component 1010 may maintain one or more cost plans 1022 specifying how the costs are allocated to the customer's account. The accounting component 1010 may include an account user interface (UI) component 1024 configured at least to provide the customer with one or more presentations of the utilization and/or costs recorded in the customer's account and, when one or more of the costs correspond to a financial balance owed to the virtual resource provider 206, one or more mechanisms for settling the account balance (e.g., payment instrument processing). The account UI 1024 may further provide for account creation, account configuration and reconfiguration, account details viewing and updating, as well as account deletion. Account (re)configuration may include selection from a qualified list of cost plans 1022 when multiple such cost plans 1022 are available.

The cost plan(s) 1022 may specify a cost per resource hour corresponding to each type of virtual resource 212 and/or implementation resource 220 (FIG. 2). Costs may be incurred by a customer for allocated and/or active resource hours ("activity costs"), for example, at an active implementation resource cost rate. In at least one embodiment, costs may also be incurred by the customer for unallocated and/or inactive resource hours associated with implementation resources in pools 704-706 (FIG. 7) dedicated to the customer ("dedicated resource costs" or "inactivity costs"), for example, at an inactive implementation resource cost rate. In at least one embodiment, activity costs and dedicated resource costs are maintained separately in a customer's account, and explicitly presented as separate items in corresponding cost statements. Alternatively, activity costs and/or rates may be adjusted to account for dedicated resource costs so that cost statements need not include an item that explicitly states dedicated resource costs. The cost plan(s) 1022 may include any suitable function of allocated, unallocated, active and/or inactive resource hours including suitable linear functions and suitable non-linear functions.

For example, activity costs and/or rates may be adjusted on a per customer basis. Cost statements may be generated periodically and each state costs incurred during a time period (the "cost statement time period") elapsed since a previously generated cost statement. Activity costs and dedicated resource costs incurred by a particular customer may be determined for the time period, and the activity costs and/or rates adjusted (e.g., increased) to include the dedicated resource costs for the time period. For example, suppose the customer provisions fifty virtual computers systems 214 (FIG. 2) and specifies that each of the fifty are to be implemented with dedicated implementation resources. In response, the resource allocation component 1008 dedicates four VCS servers 222 to the customer, each capable of implementing sixteen of the virtual computer systems requested by the customer, thus removing a capability of implementing sixty four such virtual computer systems from the general implementation resource pool 702 (FIG. 7). Further suppose the cost plan(s) 1022 for the customer's account specifies base rates of $0.10 per active dedicated resource hour and $0.05 per inactive dedicated resource hour. Over a thousand hour time period, the customer incurs 50×1000×$0.10=$5000 in active costs and 14×1000×$0.05=$700 in dedicated resource costs, for a total of $5700 in costs. As an alternative to presenting separate items for active costs and dedicated resource costs, the cost statement for the time period may present a single item corresponding to 5×1000×$0.114=$5700. That is, in this example, the customer's base rate per active resource hour is adjusted to cover total costs for the time period.

As another example, activity costs and/or rates may be adjusted on a per virtual resource type and/or dedicated implementation resource type basis. Activity costs and dedicated resource costs corresponding to a particular type of virtual resource and/or dedicated implementation resource may be determined for the cost statement time period, and the activity costs and/or rates adjusted to include the dedicated resource costs for the time period. For example, suppose that customers of the virtual resource provider 206 (FIG. 2) collectively provision virtual resources corresponding to one million resource allocation units of a particular type implemented with dedicated implementation resources in one or more dedicated pools 704, 706 (FIG. 7), and that, as part of the dedication process, a further twenty thousand resource allocation units of that type were transitioned from the general implementation resource pool 702 but remain inactive. Collectively, the virtual resource provider has an inactive dedicated resource allocation unit to active dedicated resource allocation unit ratio (an "inactive dedicated ratio" denoted herein with the letter a) of 2% in this example. The inactive dedicated ratio may also be determined from implementation resource utilization amounts. Further suppose that the customers are allocated costs in accordance with a common cost plan again specifying a base rate of $0.10 per active dedicated resource hour ($c_{active}$) and $0.05 per inactive dedicated resource hour ($c_{inactive}$). The adjusted rate per active dedicate resource hour ($c'_{active}$) may be determined with the formula:

$$c'_{active} = c_{active} + \alpha c_{inactive}.$$

That is, $0.10+2%×$0.05=$0.101, in this example.

Adjustments to account for dedicated resource costs may be determined with respect to a set of time periods, for example, including one or more previous time periods and/or forecast resource allocation unit utilization in one or more future time periods. When different customers and/or provisioned resource allocation units are associated with different cost plans, adjustments corresponding to the cost plans may be different, for example, weighted based at least in part on cost plan attributes such as cost plan type, associated customer type, profitability and/or differing base rates. In addition, activity costs and/or dedicated resource costs may be modified based at least in part on resource allocation units corresponding to implementation resources in reserved implementation resource pools such as the reserved implementation resource pool 708 of FIG. 7. For example, active and/or inactive dedicated resource hours may be offset by reserved resource hours, and costs associated with reserved resource hours may be presented as a separate item on the responsible customer's cost statement. Further in addition, the cost plan(s) 1022 may specify tiered costs and/or resource hour rates, for example, a set of decreasing costs corresponding to a set of increasing virtual resource quantity thresholds (e.g., with respect to virtual resources of a same type) and/or a set of decreasing rates corresponding to a set of increasing resource hour quantity thresholds. Still further in addition, the cost plan(s) 1022 may specify costs associated with dedicated implementation resource pool 704-706 transitioning procedures.

Figure 11:
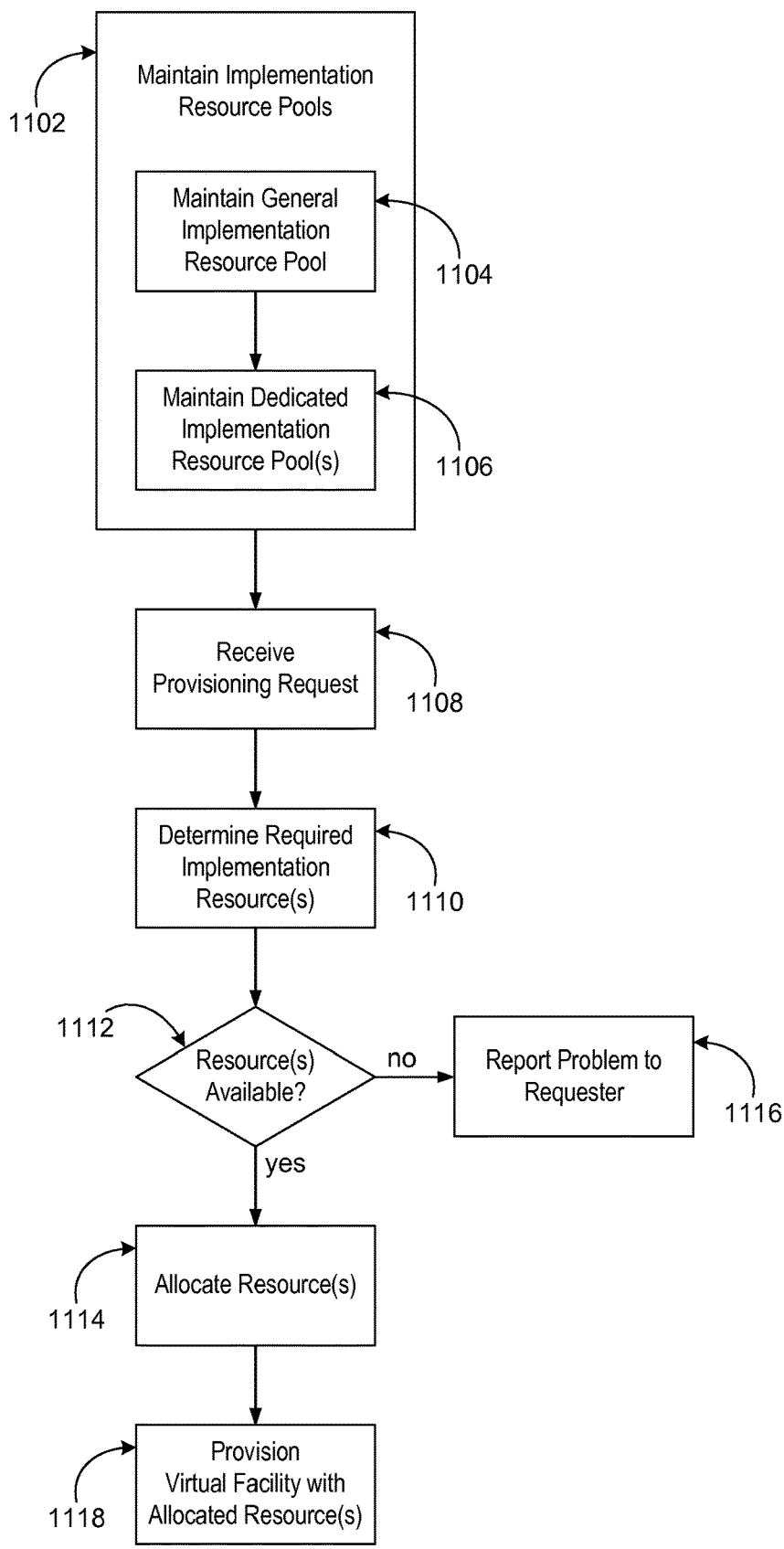
FIG. 11 is a flowchart depicting example steps for virtual provisioning in accordance with at least one embodiment.

The description now turns to example steps and/or procedures that may be performed in accordance with at least one embodiment. FIG. 11 depicts example steps for virtual provisioning in accordance with at least one embodiment. At step 1102, implementation resource pools may be maintained. For example, the resource allocation component 1008 (FIG. 10) may maintain the general implementation resource pool 702 of FIG. 7 (step 1104) and one or more dedicated implementation resource pools 704-706 (step 1106). In at least one embodiment, maintenance of the dedicated implementation resource pools 704-706 includes migration of virtual resources among the implementation resources in a particular dedicated pool so as to maximize virtual resource density with respect to implementation resources and/or to progress towards virtual resource spread targets. However, dedicated implementation resource pools 704-706 need not be established and/or maintained prior to provisioning at least one virtual resource requiring dedicated implementation resources.

At step 1108, a virtual resource provisioning request may be received. For example, the provisioning interface 1004 (FIG. 10) may receive the virtual resource provisioning request from one of the clients 202-204 (FIG. 2) responsive to virtual resource provider 206 customer interaction with the client. The virtual resource provisioning request may incorporate and/or reference a set of implementation resource constraints. For example, the set of implementation resource constraints may include constraints with respect to virtual resource density and/or virtual resource spread, constraints with respect to dedicated implementation resources including that particular types of implementation resources are to be dedicated to virtual resources of the customer, and constraints with respect to implementation resource attributes such as geographic location. At step 1110, a set of implementation resources required to implement the virtual resource requested at step 1108 may be determined. For example, the resource allocation component 1008 may determine the required set of implementation resources based at least in part on one or more parameters and/or attributes of the virtual resource provisioning request including the set of implementation resource constraints.

At step 1112, it may be determined whether the set of required implementation resources determined at step 1110 are available. For example, the resource allocation component 1008 may track availability of implementation resources in the general pool 702 (FIG. 7) and the dedicated pools 704, 706, and compare the set of required implementation resources with an available implementation resource inventory. If each of the set of required implementation resources is available, a procedure incorporating step 1112 may progress to step 1114. Otherwise, the procedure may progress to step 1116 where the availability problem may be reported to the party that sent the provisioning request received at step 1108.

At step 1114, the set of required implementation resources may be allocated. For example, the resource allocation component 1008 (FIG. 10) may update the available implementation resource inventory and transition implementation resources between pools 702-706 (FIG. 7) as necessary. The resource allocation component 1008 may select from among the available implementation resource in accordance with the set of implementation resource constraints. For example, the resource allocation component 1008 may select implementation resources with geographical separations that satisfy a constraint specifying a target geographic separation. If the set of implementation resource constraints includes a constraint specifying and/or referencing a virtual resource spread target, the resource allocation component 1008 may invoke the spread component 1016 select and/or reallocate implementation resources in accordance with the virtual resource spread target. When the set of required implementation resources includes dedicated implementation resources, the spread component 1016 may furthermore attempt to maximize virtual resource density while respecting implementation resource virtual resource capacities and/or the virtual resource spread target.

At step 1118, the requested virtual resource may be provisioned with the set of required implementation resources allocated at step 1114. For example, upon receiving notification from the resource allocation component 1008 that the resource allocation of step 1114 was successful, the provisioning interface 1004 may create a suitable provisioning workflow.

Figure 12:
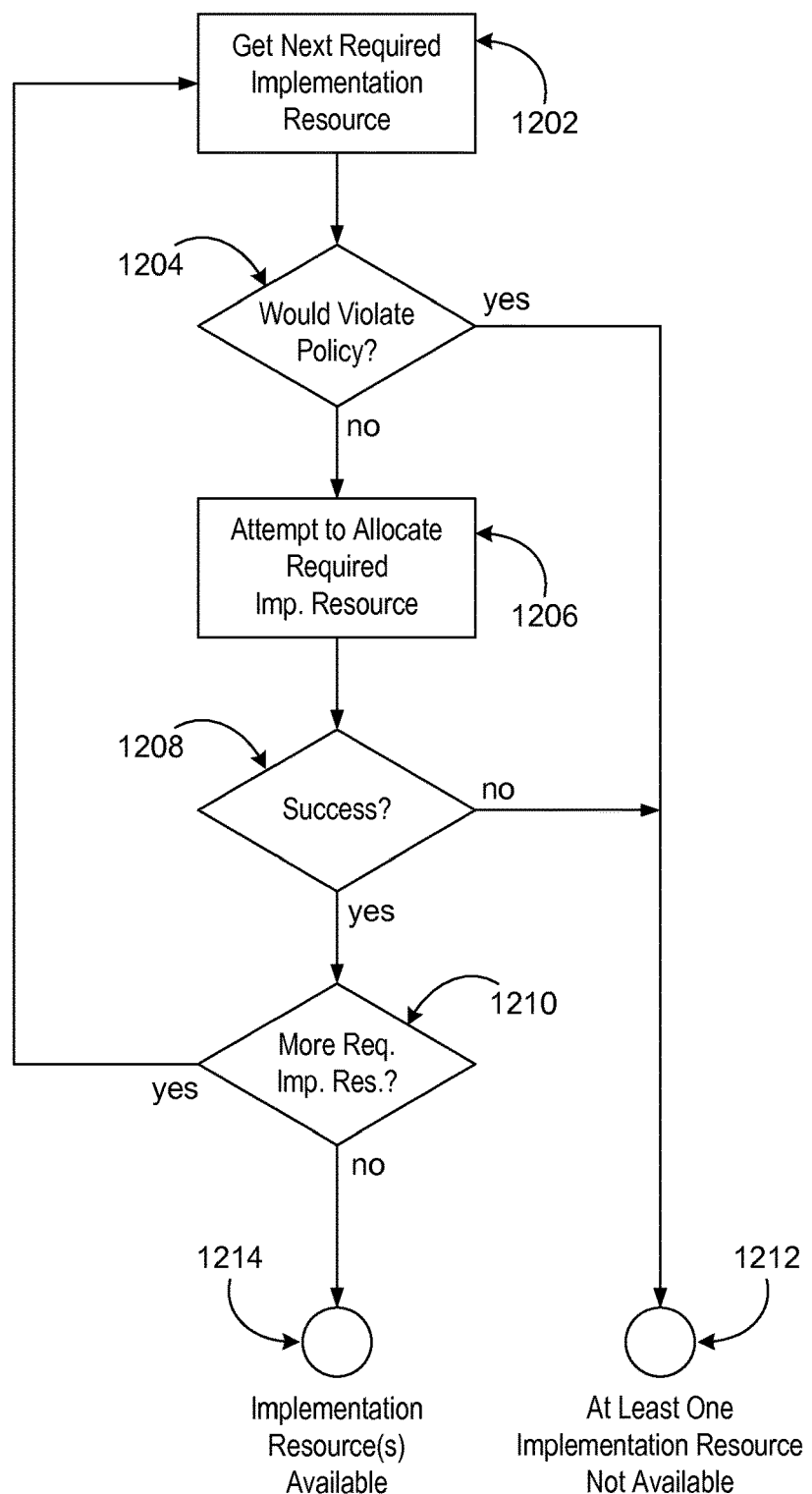
FIG. 12 is a flowchart depicting example steps for determining implementation resource availability in accordance with at least one embodiment.

FIG. 12 depicts example steps for determining implementation resource availability in accordance with at least one embodiment. At step 1202, a next (e.g., a first) implementation resource to be checked for availability may be selected from a set of required implementation resources. For example, the resource allocation component 1008 (FIG. 10) may select the next implementation resource from the set of required implementation resources determined at step 1110 of FIG. 11. At step 1204, it may be determined whether allocating the selected implementation resource would violate one or more resource allocation business policies of the virtual resource provider 206 (FIG. 2). For example, the business policy enforcement component 1014 may evaluate the selected implementation resource allocation with respect to the set of resource allocation business policies. In this example described with reference to FIG. 12, step 1204 is performed for each implementation resource in the set of required implementation resources. Alternatively, or in addition, the determination of step 1204 may be performed once for the set of required implementation resources as a whole.

At step 1206, an attempt to allocate the implementation resource selected at step 1202 (a "pre-allocation check") may be made. For example, the resource allocation component 1008 (FIG. 10) may search the appropriate implementation resource pool 702-706 (FIG. 7) for an unallocated implementation resource of a type matching the selected implementation resource. The actual allocation may be delayed (e.g., to step 1114 of FIG. 11) to ensure atomic allocation transactions (in the sense of database theory). Alternatively, partial allocations may be allowed and/or step 1206 may allocate the selected implementation resource if possible. At step 1208, it may be determined whether the allocation attempt of step 1206 was successful. If so, a procedure incorporating step 1208 may progress to step 1210. Otherwise, the procedure may progress to one or more steps not shown in FIG. 12 (e.g., step 1116 of FIG. 11) with a status 1212 indicating that at least one implementation resource is not available.

At step 1210, it may be determined whether there are more implementation resources to be checked in the set of required implementation resources. If so, the procedure may progress to step 1202. Otherwise, the procedure may progress to one or more steps not shown in FIG. 12 (e.g., step 1114 of FIG. 11) with a status 1214 indicating that each of the set of required implementation resources is available.

Figure 13:
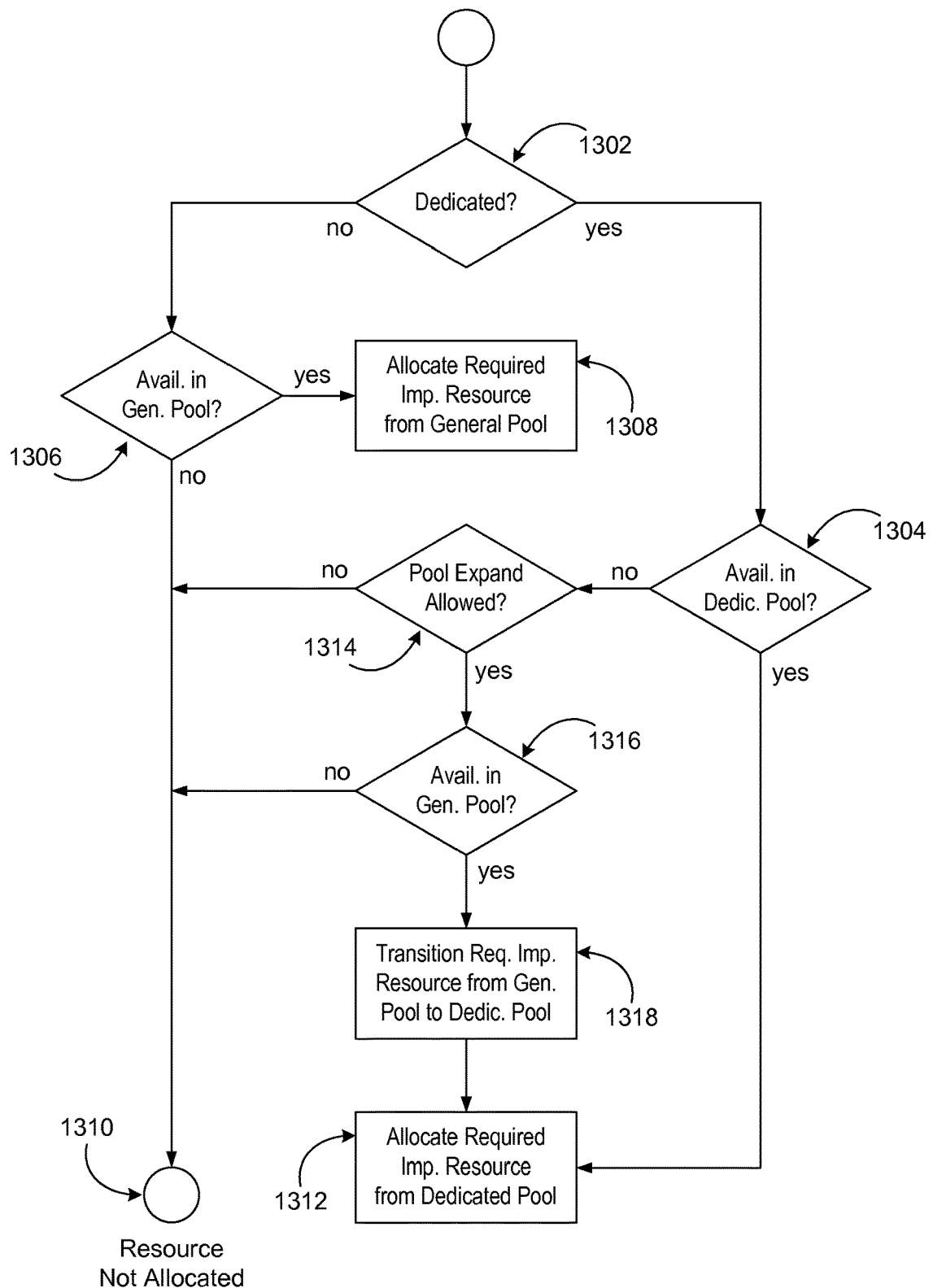
FIG. 13 is a flowchart depicting example steps for allocating and/or attempting to allocate an implementation resource in accordance with at least one embodiment.

FIG. 13 depicts example steps for allocating and/or attempting to allocate an implementation resource in accordance with at least one embodiment. For example, the steps of FIG. 13 may be incorporated into step 1112 or step 1114 of FIG. 11 and/or step 1206 of FIG. 12. At step 1302, it may be determined whether an implementation resource to be allocated (the "allocation candidate") is to be allocated from a particular dedicated implementation resource pool. For example, the set of implementation resources determined at step 1110 of FIG. 11 may include a set of implementation resources to be allocated from the dedicated implementation resource pool 706 of FIG. 7, and the allocation candidate may be one of those, and/or the resource allocation component 1008 (FIG. 10) may identify one or more dedicated implementation resource constraints associated with the virtual resource provisioning request received at step 1108 of FIG. 11. If the allocation candidate is to be allocated from one of the dedicated implementation resource pools 704-706, a procedure incorporating step 1302 may progress to step 1304. Otherwise, the procedure may progress to step 1306.

At step 1306, it may be determined whether an implementation resource matching the allocation candidate is available (e.g., unallocated) in the general implementation resource pool 702 (FIG. 7). For example, the resource allocation component 1008 (FIG. 10) may search the general implementation resource pool 702 for an unallocated implementation resource of a type that matches the allocation candidate. If the allocation candidate is available in the general implementation resource pool 702, the procedure may progress to step 1308. Otherwise, the procedure may progress to one or more steps not shown in FIG. 13, for example, step 1116 of FIG. 11, with a status 1310 indicating that the allocation candidate could not be allocated. At step 1308, the allocation candidate may be allocated from the general implementation resource pool 702. For example, the resource allocation component 1008 (FIG. 10) may record the general pool 702 implementation resource found at step 1306 as allocated to an associated virtual resource (e.g., the virtual resource associated with the provisioning request of step 1108 of FIG. 11).

At step 1304, it may be determined whether an implementation resource matching the allocation candidate is available in the particular dedicated implementation resource pool determined at step 1302 (the "candidate dedicated pool"). For example, the resource allocation component 1008 (FIG. 10) may search the dedicated implementation resource pool 706 (FIG. 7) for an unallocated implementation resource of a type that matches the allocation candidate. If the allocation candidate is available in the candidate dedicated pool, the procedure may progress to step 1312. Otherwise, the procedure may progress to step 1314. At step 1312, the allocation candidate may be allocated from the candidate dedicated pool. For example, the resource allocation component 1008 may record the dedicated pool 706 implementation resource found at step 1304 as allocated to the associated virtual resource.

If it is determined that the allocation candidate is not currently available in the candidate dedicated pool, at step 1314, it may further be determined whether the candidate dedicated pool is expandable. For example, the dedicated resource pools component 1012 (FIG. 10) may check the associated cost plan(s) 1022 and/or request an evaluation of an expansion of the candidate dedicated pool by the business policy enforcement component 1014. If the candidate dedicated pool is expandable, the procedure may progress to step 1316, otherwise, the procedure may progress to one or more steps not shown in FIG. 13, for example, step 1116 of FIG. 11, with the status 1310 indicating that the allocation candidate could not be allocated.

At step 1316, it may be determined whether an implementation resource matching the allocation candidate is available in the general implementation resource pool 702 (FIG. 7), for example, as described above for step 1306. If so, the procedure may progress to step 1318. Otherwise, the procedure may progress to one or more steps not shown in FIG. 13, for example, step 1116 of FIG. 11, with the status 1310 indicating that the allocation candidate could not be allocated. At step 1318, the implementation resource found at step 1316 may be transitioned to the candidate dedicated pool (and/or the transition may be initiated). For example, the dedicated resource pools component 1012 may request the pool transition component 1018 to transition the general pool 702 implementation resource found at step 1316. The transitioned implementation resource may be allocated as described above for step 1312. When the steps of FIG. 13 are being performed as part of a pre-allocation check, step 1308, step 1312 and step 1318 may be omitted and/or correspond to a "resource available" status.

Figure 14:
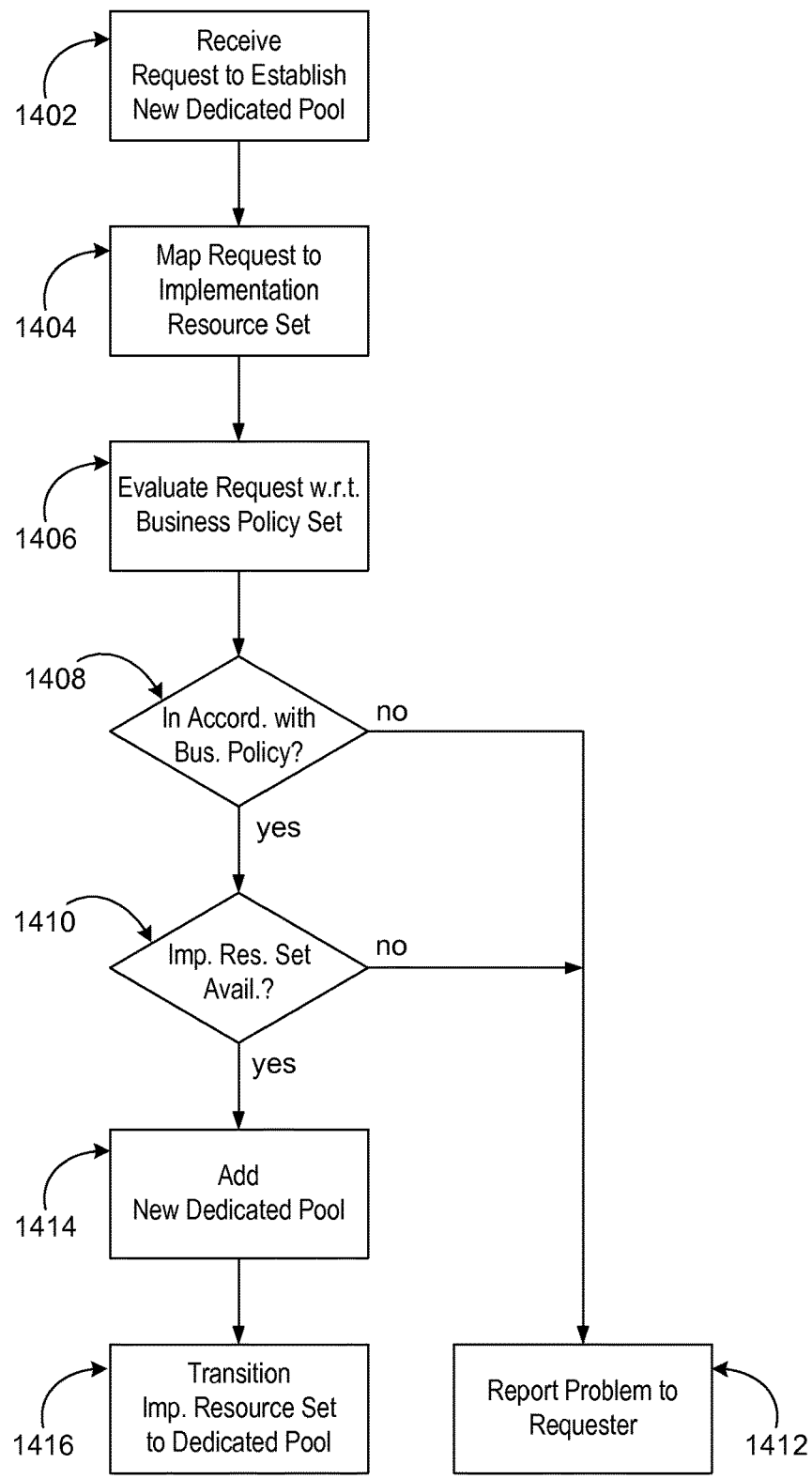
FIG. 14 is a flowchart depicting example steps for establishing a dedicated implementation resource pool in accordance with at least one embodiment.

It may be that the set of implementation resources determined at step 1110 of FIG. 11 includes a set of implementation resources to be allocated from a dedicated implementation resource pool that does not yet exist. In this case the dedicated resource pools component 1012 (FIG. 10) may establish a new dedicated implementation resource pool including the set of implementation resources to be allocated. FIG. 14 depicts example steps for establishing a dedicated implementation resource pool in accordance with at least one embodiment. At step 1402, a request to establish a new dedicated implementation resource pool (a "new dedicated pool request") may be received. For example, the dedicated resource pools component 1012 may receive the request responsive to the virtual resource provisioning request of step 1108 of FIG. 11.

At step 1404, the new dedicated pool request may be mapped to a set of implementation resources. The new dedicated pool request may explicitly specify a set of implementation resources to be added to the new dedicated implementation resource pool. Alternatively, or in addition, the new dedicated pool request may specify a set of virtual resources to be implemented with dedicated implementation resources, and the dedicated resource pools component 1012 (FIG. 10) may map the set of virtual resources to the set of implementation resources.

At step 1406, the new dedicated pool request may be evaluated with respect to the set of resource allocation business policies, for example, by the business policy enforcement component 1014 (FIG. 10). At step 1408, it may be determined whether the new dedicated pool request is in accordance with the et of resource allocation business policies based at least in part on the evaluation of step 1406. If so, a procedure incorporating step 1408 may progress to step 1410. Otherwise, the problem may be reported to the requester at step 1412.

At step 1410, it may be determined whether the set of implementation resources obtained at step 1404 is available in the general implementation resource pool 702 (FIG. 2), for example, as described above for step 1316 of FIG. 13. If so, the procedure may progress to step 1414. Otherwise, the procedure may progress to step 1412 to report the problem to the requester. At step 1414, the new dedicated implementation resource pool may be added to the set of dedicated implementation resource pools 704-706 (FIG. 7), for example, by the dedicated resource pools component 1012 (FIG. 10). At step 1416, the set of implementation resources identified as available in the general implementation resource pool 702 may be transitioned to the new dedicated implementation resource pool.

Figure 15:
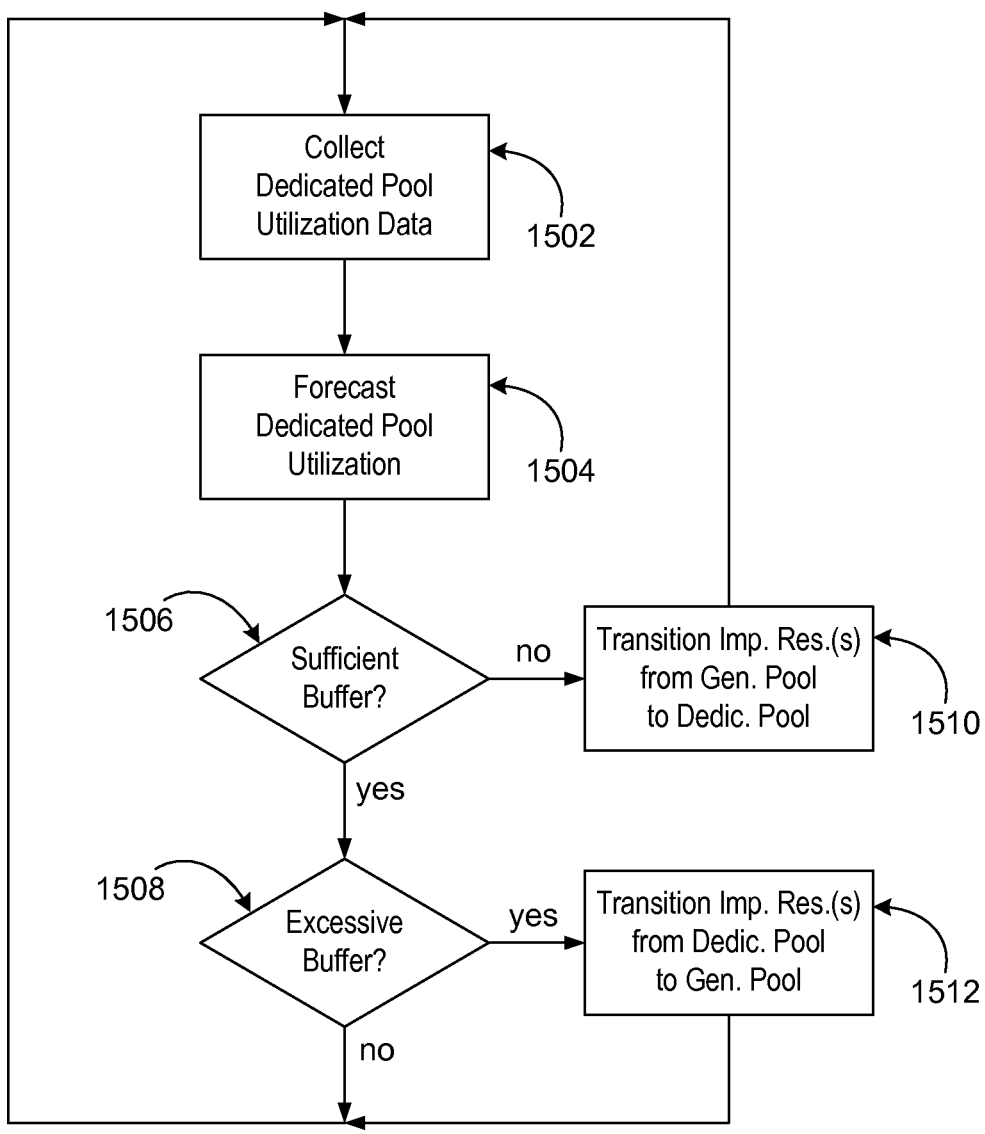
FIG. 15 is a flowchart depicting example steps for maintaining an inactive dedicated implementation resource buffer in accordance with at least one embodiment.

As described above with reference to FIG. 10, dedicated implementation resource pools may be established with an inactive dedicated implementation resource buffer. FIG. 15 depicts example steps for maintaining an inactive dedicated implementation resource buffer in accordance with at least one embodiment. At step 1502, dedicated pool utilization data may be collected. For example, the pool utilization component 1020 may monitor levels of activity and/or inactivity in the dedicated implementation resource pool 706 (FIG. 7). At step 1504, future dedicated pool utilization may be forecast based at least in part on the dedicated pool utilization data collected at step 1502, for example, by the pool utilization component 1020.

At step 1506, it may be determined whether a current inactive dedicated implementation resource buffer is sufficient. For example, the pool utilization component 1020 may compare a forecast level of inactivity in the dedicated implementation resource pool 706 (FIG. 7) to a target level of inactivity for the dedicated implementation resource pool 706 and/or a minimum inactivity buffer threshold. If the current buffer is sufficient (e.g., the forecast level of inactivity meets or exceeds the minimum inactivity buffer threshold), a procedure incorporating step 1506 may progress to step 1508. Otherwise, the procedure may progress to step 1510. At step 1510, one or more implementation resources may be transitioned from the general implementation resource pool 702 (e.g., from the reserved portion 708 of the general implementation resource pool 702) to the dedicated implementation resource pool 706. For example, the pool utilization component 1020 may request the pool transition component 1018 to transition sufficient implementation resources to the dedicated implementation resource pool 706 so that the forecast buffer is sufficient.

At step 1508, it may be determined whether a current inactive dedicated implementation resource buffer is excessive. For example, the pool utilization component 1020 may compare the forecast level of inactivity in the dedicated implementation resource pool 706 (FIG. 7) to the target level of inactivity for the dedicated implementation resource pool 706 and/or a maximum inactivity buffer threshold. If the current buffer is excessive (e.g., the forecast level of inactivity exceeds the maximum inactivity buffer threshold), the procedure may progress to step 1512. Otherwise, the procedure may progress to step 1502 to collect more data. At step 1512, one or more implementation resources may be transitioned from the dedicated implementation resource pool 706 to the general implementation resource pool 702 (e.g., to the reserved portion 708 of the general implementation resource pool 702). For example, the pool utilization component 1020 may request the pool transition component 1018 to transition sufficient implementation resources to the general implementation resource pool 706 so that the forecast level of inactivity corresponds to the target level of inactivity for the dedicated implementation resource pool 706.

Figure 16:
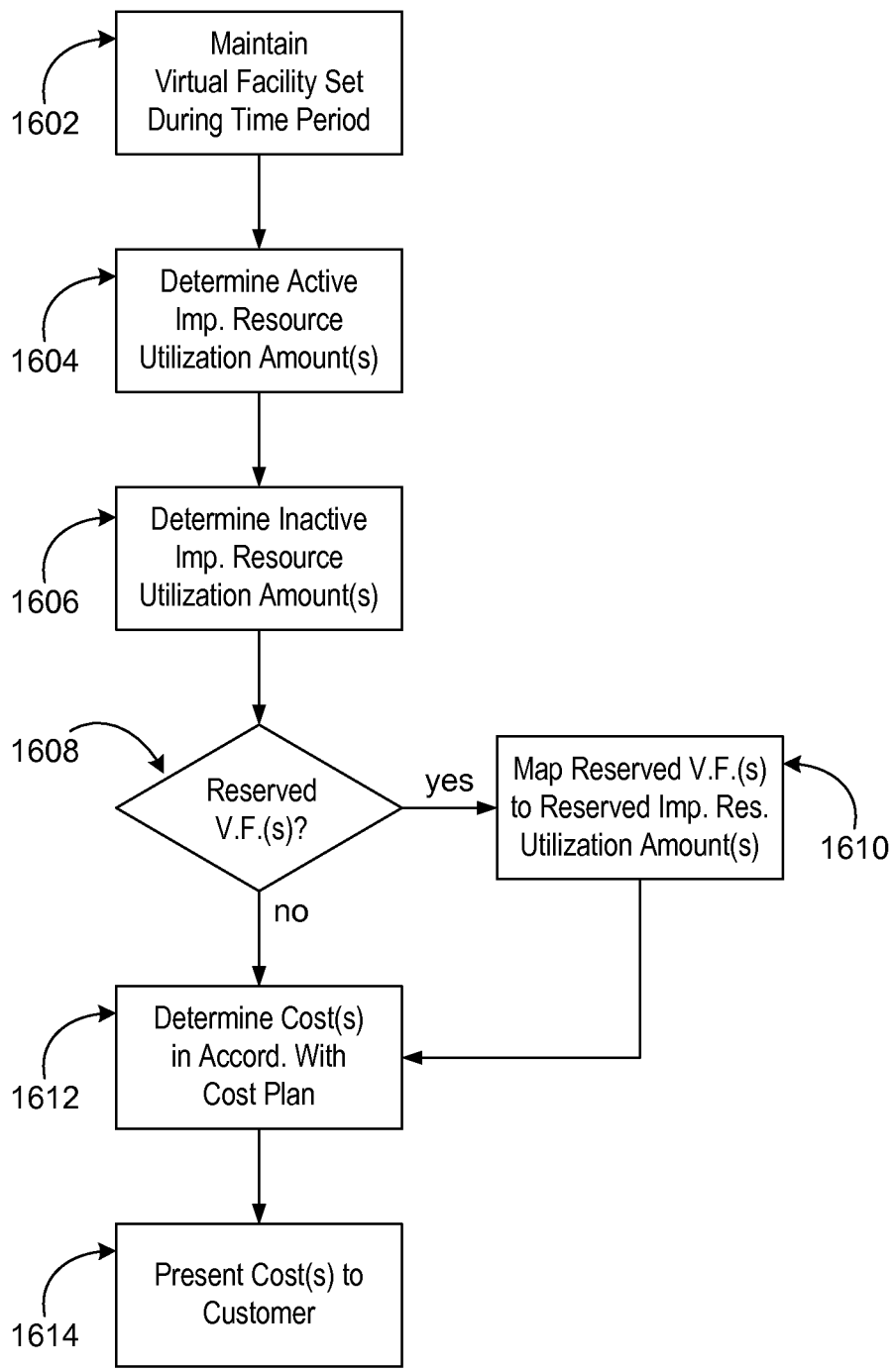
FIG. 16 is a flowchart depicting example steps for tracking costs in accordance with at least one embodiment.

Costs associated with maintaining provisioned virtual resources may be presented to responsible customers of the virtual resource provider 206 (FIG. 2) according to cost presentation schedules specified by an administrator of the virtual resource provider 206 and/or the customers. FIG. 16 depicts example steps for tracking costs in accordance with at least one embodiment. At step 1602, a set of virtual resources may be maintained during a time period. For example, the virtual resource provider 206 may maintain a set of the virtual resources 212 for a particular customer during the time period.

At step 1604, one or more active implementation resource utilization amounts corresponding to the set of virtual resources maintained at step 1602 may be determined. For example, the accounting component 1010 of FIG. 10 may determine a number of active resource hours associated with each of the set of virtual resources during the time period. At step 1606, one or more inactive implementation resource utilization amounts corresponding to the set of virtual resources maintained at step 1602 may be determined. For example, the accounting component 1010 may determine a number of inactive resource hours associated with each of the set of virtual resources during the time period.

At step 1608, it may be determined whether the set of virtual resources are associated with a set of reserved virtual resources. For example, the customer may provision the set of reserved virtual resources with the provisioning interface 1004 (FIG. 10) and/or associate the set of reserved virtual resources with the previously provisioned set of virtual resources maintained at step 1602. If there are reserved virtual resources associated with the set of virtual resources for which costs are being determined, a procedure incorporating step 1608 may progress to step 1610. Otherwise the procedure may progress to step 1612. At step 1610, the set of reserved virtual resources may be mapped to one or more reserved implementation resource utilization amounts. For example, the accounting component 1010 of FIG. 10 may determine a number of reserved resource hours associated with each of the set of reserved virtual resources.

At step 1612, one or more costs may be determined in accordance with one or more cost plans associated with the customer and/or the set of virtual resources. For example, the accounting component 1010 (FIG. 10) may determine the cost(s) based at least in part on the cost plan(s) 1022 and/or the active, inactive and/or reserved implementation resource utilization amounts determined at step 1604, step 1606 and/or step 1610, respectively. At step 1614, the cost(s) determined at step 1612 may be presented to the customer. For example, the accounting component 1010 may generate one or more cost presentations accessible with the account UI 1024.

Figure 17:
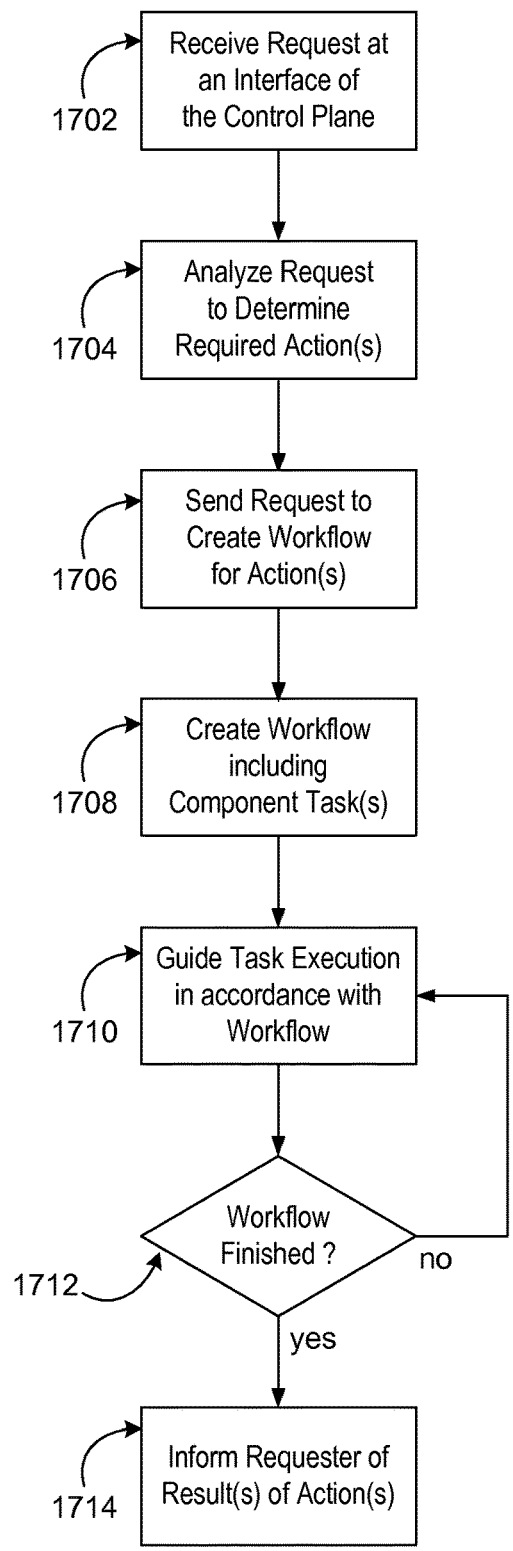
FIG. 17 is a flowchart depicting example steps for workflow in accordance with at least one embodiment.

As described above with reference to FIG. 10, the control plane 1002 may be facilitated by one or more workflows maintained by the workflow component 1006. FIG. 17 depicts example steps for workflow in accordance with at least one embodiment. At step 1702, a request may be received by an interface of the control plane 1002 (FIG. 10). For example, the provisioning interface 1004 and/or the account UI 1024 of the control plane 1002 may receive the request from a customer and/or administrator of the virtual resource provider 206. The request may be a call to a programmatic interface such as an application programming interface (API) or a Web services interface, e.g., utilizing a Simple Object Access Protocol (SOAP) call. Alternatively, or in addition, the request may be received through a graphical user interface (GUI) such as a Web-based GUI. At step 1704, the request may be analyzed to determine one or more actions required to successfully complete the request. For example, the provisioning interface 208 may analyze the request, and determine a set of actions required to provision a set of virtual resources. When an interface element receiving the request corresponds to a specific action to be performed, the interface may extract information from the request to be utilized in determining aspects and/or parameters of the action to be performed.

At step 1706, a request may be sent to create a workflow based at least in part on the one or more actions determined at step 1704. For example, provisioning interface 1004 (FIG. 10) may send the request to the workflow component 1006. The request to create the workflow may include the action(s), action metadata such as type of action, and/or action parameters. In at least one embodiment, the control plane 1002 and/or the workflow component 1006 maintains a job queue for such requests, and workflows are created responsive to new additions to the job queue. At step 1708, a workflow and one or more component tasks may be created. For example, the workflow component 1006 may analyze the request of step 1706 to determine the appropriate workflow and component tasks to create.

At step 1710, execution of the component task(s) may be guided in accordance with the workflow. For example, the workflow component 1006 (FIG. 10) may activate elements of interfaces of the implementation resources 220 (FIG. 2) to provision the set of virtual resources. Alternatively, or in addition, the workflow component 1006 may manage bids for execution of the component task(s) by components of the virtual resource provider 206. At step 1712, it may be determined whether the workflow has finished. For example, the workflow component 1006 may determine whether a final task in a sequence of tasks managed by the workflow has completed. If so, a procedure incorporating step 1712 may progress to step 1714. Otherwise the procedure may return to step 1710 for a next task and/or task sequence. Workflows may guide multiple task sequences executing in parallel. In this case, it may be that the workflow is not finished until each of the multiple task sequences completes and/or an explicit workflow finished flag is set by one of the component tasks. At step 1714, the sender of the request of step 1702 may be informed of the result(s) of the action(s).

The various embodiments described herein may be implemented in a wide variety of operating environments, which in some cases may include one or more user computers, computing devices, or processing devices which may be utilized to operate any of a number of applications. User or client devices may include any of a number of general purpose personal computers, such as desktop or laptop computers running a standard operating system, as well as cellular, wireless, and handheld devices running mobile software and capable of supporting a number of networking and messaging protocols. Such a system also may include a number of workstations running any of a variety of commercially-available operating systems and other known applications for purposes such as development and database management. These devices also may include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. Such a network may include, for example, a local area network, a wide-area network, a virtual private network, the Internet, an intranet, an extranet, a public switched telephone network, an infrared network, a wireless network, and any combination thereof. The network may, furthermore, incorporate any suitable network topology. Examples of suitable network topologies include, but are not limited to, simple point-to-point, star topology, self organizing peer-to-peer topologies, and combinations thereof.

In embodiments utilizing a Web server, the Web server may run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment may include a variety of data stores and other memory and storage media as discussed above. These may reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device may include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also may include a computer-readable storage media reader, a communications device (e.g., a modem, a network card (wireless or wired), an infrared communication device, etc.), and working memory as described above. The computer-readable storage media reader may be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules including program modules, services, or other elements located within at least one working memory device, including an operating system and application programs, such as a client application or Web browser. It should be appreciated that alternate embodiments may have numerous variations from that described above. For example, customized hardware might also be utilized and/or particular elements might be implemented in hardware, software (including portable software, such as applets), or both. Further, connection to other computing devices such as network input/output devices may be employed.

Storage media and computer readable media for containing code, or portions of code, may include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which may be utilized to store the desired information and which may be accessed by the a system device. Program modules, program components and/or programmatic objects may include computer-readable and/or computer-executable instructions of and/or corresponding to any suitable computer programming language. In at least one embodiment, each computer-readable medium may be tangible. In at least one embodiment, each computer-readable medium may be non-transitory in time. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

The use of the terms "a" and "an" and "the" and similar referents in the context of describing embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope unless otherwise claimed. No language in the specification should be construed as indicating any non-claimed element as essential to the practice of at least one embodiment.

Preferred embodiments are described herein, including the best mode known to the inventors. Variations of those preferred embodiments may become apparent to those of ordinary skill in the art upon reading the foregoing description. The inventors expect skilled artisans to employ such variations as appropriate, and the inventors intend for embodiments to be constructed otherwise than as specifically described herein. Accordingly, suitable embodiments include all modifications and equivalents of the subject matter recited in the claims appended hereto as permitted by applicable law. Moreover, any combination of the above-described elements in all possible variations thereof is contemplated as being incorporated into some suitable embodiment unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for provisioning virtual resources, comprising:
    under control of one or more computer systems configured with executable instructions,
    receiving, at a control plane of a virtual machine provider having a plurality of customers, a request to launch a virtual machine from a customer of the plurality of customers of the virtual machine provider, the request associated with information indicating that the virtual machine is to be hosted by at least one dedicated hardware server;
    in response to the request, selecting an available hardware server to dedicate to the customer from a set of available hardware servers configured by default to be shared by the plurality of customers;
    dedicating the available hardware server to hosting virtual machines of the customer by at least:
        transitioning the available hardware server to a dedicated server pool in accordance with an entry procedure, the available hardware server in a transition state for at least part of the entry procedure, wherein transitioning the available hardware server to the dedicated server pool comprises:
            identifying the available hardware server in a reserved server pool, the reserved server pool comprising hardware resources to which the customer is given priority over other customers;
            terminating the available hardware server from implementing one or more other virtual machines for one or more other customers; and
            transitioning the available hardware server from the reserved server pool to the dedicated server pool in accordance with the entry procedure; and
        in response to transitioning the available hardware server, storing information indicating that the available hardware server is dedicated to hosting virtual machines only of the customer; and
    after dedicating the available hardware server to hosting virtual machines of the customer, launching the virtual machine on the available hardware server, wherein launching the virtual machine includes provisioning the virtual machine into a secure virtual network, the secure virtual network operated by the virtual machine provider on behalf of the customer.

2. A computer-implemented method according to claim 1, wherein transitioning the available hardware server to the dedicated server pool comprises transitioning the available hardware server from a general server pool to the dedicated server pool, the general server pool comprising the set of available hardware servers.

3. A computer-implemented method according to claim 2, wherein transitioning the available hardware server comprises:
    identifying a virtual machine provider event associated with the available hardware server when the available hardware server is within the general server pool, the available hardware server comprising a set of hardware resources;
    initiating the entry procedure selected from a set of entry procedures, the entry procedure indicating at least a transition time for the available hardware server; and
    concluding the entry procedure when the available hardware server enters the dedicated server pool.

4. A computer-implemented method according to claim 3, wherein the virtual machine provider event comprises at least one of a virtual machine launching request or an automated transition based at least in part on a forecast launching request.

5. A computer-implemented method according to claim 3, wherein the entry procedure comprises at least one of data storage media formatting, data storage media erasure including secure data erasure procedures, software installation, component configuration, component reallocation, access control configuration, firewall reconfiguration, virtual machine migration, authentication credential creation and issuance, mobile data center relocation, manual review of server transition by the customer, or customer-provided entry procedures including customer-provided computer-executable instructions.

6. A computer-implemented method according to claim 1, wherein provisioning the virtual machine into the secure virtual network lowers a probability that at least one other customer of the virtual machine provider gains access to unpublished information concerning the virtual machine.

7. A computer-implemented method according to claim 1, wherein the request is a first request, the method further comprising:
    receiving a second request to launch a second virtual machine from the customer, the second request associated with a set of server constraints including at least a second server constraint specifying that virtual machines of the customer be hosted by the same dedicated hardware server;
    identifying, from a data store, the available hardware server previously dedicated to the virtual machine of the customer; and
    launching the second virtual machine on the dedicated available hardware server.

8. A computer-implemented method according to claim 7, further comprising:
    receiving, from the customer, a request to terminate the virtual machine, the request to terminate identifying the dedicated available hardware server;

in response to the request to terminate the virtual machine, terminating the virtual machine hosted by the dedicated available hardware server; and allowing the dedicated available hardware server to continue to host the second virtual machine.

9. A computer-implemented method according to claim 1, further comprising:

receiving, from the customer, a request to increase at least one operational parameter of the virtual machine of the customer;

identifying, from the data store, the available hardware server previously dedicated to the virtual machine of the customer; and dedicating a second available hardware server to the virtual machine such that the available hardware server and the second available hardware server host the virtual machine.

10. A computer-implemented method according to claim 1, wherein:

the request to provision is associated with a set of server constraints comprising at least one of a virtual machine spread constraint specifying a target implementation spread of a plurality of virtual machines over a plurality of hardware servers, a virtual machine density constraint specifying a target implementation density of the plurality of virtual machines over the plurality of hardware servers, a geographic constraint specifying a target geographic separation of the plurality of hardware servers, or a dedicated server constraint specifying that the virtual machine be hosted by the hardware server drawn from the dedicated server pool;

analyzing the request to determine that dedicating the available hardware server to the customer would not violate one or more resource allocation policies associated with the virtual machine provider; and selecting the available hardware server to dedicate to the customer comprises, at least in response to the analyzing the request, selecting the available hardware server based at least in part on the set of server constraints.

11. A computer-implemented method for provisioning virtual machines, comprising:

under control of one or more computer systems configured with executable instructions, maintaining a general server pool including a plurality of general hardware servers configured by default to be shared by a plurality of customers of a virtual machine provider to implement a plurality of virtual machines associated with the plurality of customers;

maintaining a dedicated server pool by transitioning at least one hardware server from the general server pool to the dedicated server pool in accordance with a server transition procedure by at least:

searching the dedicated server pool for an unallocated hardware server of a type that matches the at least one hardware server;

in the event the unallocated hardware server cannot be found in the dedicated server pool, determining that expansion of the dedicated server pool is permissible based at least in part on one or more resource allocation policies;

searching the general server pool for the unallocated hardware server of the type that matches the at least one hardware server; and identifying the unallocated hardware server in the general server pool as the at least one hardware server, the at least one hardware server dedicated to a subset of the plurality of customers of the virtual machine provider;

receiving, from a customer of the virtual machine provider, a request to launch a virtual machine, the request associated with a server constraint specifying that the virtual machine be hosted by a hardware server drawn from the dedicated server pool;

in response to the request, launching the virtual machine at least in part by allocating the at least one dedicated hardware server to the virtual machine such that the at least one dedicated hardware server is dedicated to implementing virtual machines of the customer, the at least one dedicated hardware server comprising a set of hardware resources, wherein allocating the at least one dedicated hardware server to the virtual machine establishes, at least in part, a secure virtual network between the customer and other customers of the virtual machine provider; and indicating, in a data store associated with the virtual machine provider, that the at least one dedicated hardware server has been dedicated to hosting virtual machines authorized by a policy specified by the customer.

12. A computer-implemented method according to claim 11, wherein maintaining the dedicated server pool comprises transitioning hardware servers from the general server pool to the dedicated server pool when an inactivity level of the dedicated server pool is less than a first threshold.

13. A computer-implemented method according to claim 12, wherein maintaining the dedicated server pool further comprises transitioning other hardware servers from the dedicated server pool to the general server pool when the inactivity level of the dedicated server pool is greater than a second threshold.

14. A computer-implemented method according to claim 11, wherein allocating the at least one dedicated hardware server to the virtual machine establishes an information barrier between at least one of the other customers of the virtual machine provider and the customer.

15. A computer-implemented method according to claim 11, wherein launching the virtual machine isolates the virtual machine, at least in part, from at least one operational fault occurring at the general hardware server.

16. A computer-implemented method according to claim 11, wherein the transitioning is predictive based at least in part on a forecast demand for the virtual machine by the subset of the plurality of customers.

17. A computer-implemented method according to claim 11, wherein the customer selects the server transition procedure from a plurality of server transition procedures offered by the virtual machine provider.

18. A computer-implemented method according to claim 11, wherein the virtual machine comprises at least one of: a virtual computer system and a virtual data store.

19. A computer-implemented method according to claim 11, wherein the at least one dedicated hardware server is associated with a set of hardware resources, the set of hardware resources comprising at least one of: a storage device, a physical server, a server rack, a physically secured portion of a data center, a portion of a data center monitored with respect to physical access, a data center, a mobile data center, a network switch, a network connection, a wireless network transmitter, and a wireless network receiver.

20. A computer-implemented method according to claim 11, wherein maintaining the dedicated server pool comprises transitioning hardware servers into the dedicated server pool based at least in part on anticipated demand for hardware servers by the subset of the plurality of customers.

21. A computer-implemented method according to claim 11, wherein the server constraint further specifies that a first component of the virtual machine be implemented by at least a first hardware server from the dedicated server pool and a second component of the virtual machine be implemented by at least a first hardware server from the general server pool.

22. A computer-implemented method according to claim 11, wherein the virtual machine comprises a first component and a second component, each component implemented by a distinct hardware server drawn from at least the general server pool and the dedicated server pool, the first component distinct from the second component.

23. A computer-implemented method according to claim 11, wherein the customer is associated with the virtual machine, the method further comprising:
  receiving, from the customer, a request to terminate the virtual machine, the request to terminate identifying the at least one dedicated hardware server; and
  in response to the request to terminate the virtual machine, terminating the virtual machine hosted by the at least one dedicated hardware server.

24. One or more non-transitory computer-readable media comprising computer-executable instructions that, when executed by one or more computer systems, cause the one or more computer systems to perform operations comprising:
  receiving, at a control plane of a virtual machine provider having a plurality of customers, a request to launch a virtual machine from a customer of the plurality of customers of the virtual machine provider, the request associated with information indicating that the virtual machine is to be hosted by at least one dedicated hardware server;
  in response to the request, selecting an available hardware server to dedicate to the customer from a set of available hardware servers configured by default to be shared by the plurality of customers, wherein selecting the available hardware server comprises:
    searching a dedicated server pool for an unallocated hardware server of a type that matches the available hardware server;
    in the event the unallocated hardware server cannot be found in the dedicated server pool, determining that expansion of the dedicated server pool is permissible based at least in part on one or more resource allocation policies;
    searching a general server pool for the unallocated hardware server of the type that matches the available hardware server; and
    identifying the unallocated hardware server in the general server pool as the available hardware server;
  dedicating the available hardware server to hosting virtual machines of the customer by at least:
    transitioning the available hardware server from the general server pool to the dedicated server pool in accordance with an entry procedure, the available hardware server in a transition state for at least part of the entry procedure; and
    in response to transitioning the available hardware server, storing information indicating that the available hardware server is dedicated to hosting virtual machines only of the customer; and
  after dedicating the available hardware server to hosting virtual machines of the customer, launching the virtual machine on the available hardware server, wherein launching the virtual machine includes provisioning the virtual machine into a secure virtual network, the secure virtual network operated by the virtual machine provider on behalf of the customer.

* * * * *